(12) United States Patent
Corten et al.

(10) Patent No.: US 10,233,340 B2
(45) Date of Patent: Mar. 19, 2019

(54) AQUEOUS COATING COMPOSITION COMPRISING A THICKENER PREPARABLE FROM AT LEAST ONE POLYAMIDE AND AT LEAST ONE FURTHER POLYMER

(71) Applicant: BASF Coatings GmbH, Muenster (DE)

(72) Inventors: Cathrin Corten, Shanghai (CN); Dirk Eierhoff, Muenster (DE); Ursula Heimeier, Sendenhorst (DE); Klaus-Juergen Kanngiesser, Muenster (DE)

(73) Assignee: BASF Coatings GmbH, Münster (DE)

( * ) Notice: Subject to any disclaimer, the term of this patent is extended or adjusted under 35 U.S.C. 154(b) by 85 days.

(21) Appl. No.: 15/505,487

(22) PCT Filed: Aug. 21, 2015

(86) PCT No.: PCT/EP2015/069260
§ 371 (c)(1),
(2) Date: Feb. 21, 2017

(87) PCT Pub. No.: WO2016/026964
PCT Pub. Date: Feb. 25, 2016

(65) Prior Publication Data
US 2017/0275478 A1    Sep. 28, 2017

(30) Foreign Application Priority Data
Aug. 22, 2014  (EP) .................................... 14182027

(51) Int. Cl.
| | | |
|---|---|---|
| *C09D 7/43* | (2018.01) | |
| *C09D 133/14* | (2006.01) | |
| *C09D 167/02* | (2006.01) | |
| *C09D 175/04* | (2006.01) | |
| *C09D 177/08* | (2006.01) | |
| *B05D 1/00* | (2006.01) | |
| *B05D 1/02* | (2006.01) | |
| *C08L 77/08* | (2006.01) | |

(52) U.S. Cl.
CPC ............. *C09D 7/43* (2018.01); *B05D 1/007* (2013.01); *B05D 1/02* (2013.01); *C09D 133/14* (2013.01); *C09D 167/02* (2013.01); *C09D 175/04* (2013.01); *C09D 177/08* (2013.01); *C08L 77/08* (2013.01)

(58) Field of Classification Search
CPC ...... C09D 7/43; C09D 133/14; C09D 167/02; C09D 175/04; C09D 177/08; B05D 1/007; B05D 1/00; B05D 1/02
See application file for complete search history.

(56) References Cited

U.S. PATENT DOCUMENTS

| | | | |
|---|---|---|---|
| 2,793,219 | A | 5/1957 | Barrett et al. |
| 2,955,121 | A | 10/1960 | Myers et al. |
| 5,994,494 | A | 11/1999 | Wakui |

FOREIGN PATENT DOCUMENTS

| | | |
|---|---|---|
| DE | 40 09 858 A1 | 10/1901 |
| DE | 25 06 211 A1 | 8/1975 |
| DE | 44 37 535 A1 | 4/1996 |
| DE | 44 38 504 A1 | 5/1996 |
| DE | 199 48 004 A1 | 7/2001 |
| EP | 0 228 003 A1 | 7/1987 |
| EP | 0 562 329 A1 | 9/1993 |
| EP | 0 593 454 B1 | 5/1997 |
| EP | 0 877 063 A2 | 11/1998 |
| EP | 0 787 159 B1 | 12/1998 |
| EP | 1 153 989 A1 | 11/2001 |
| JP | 2005-171155 A | 6/2005 |
| WO | 2005/021168 A1 | 3/2005 |
| WO | 2009/100938 A1 | 8/2009 |

OTHER PUBLICATIONS

International Search Report dated Nov. 27, 2015 in PCT/EP2015/069260 filed Aug. 21, 2015.

*Primary Examiner* — John E Uselding
(74) *Attorney, Agent, or Firm* — Oblon, McClelland, Maier & Neustadt, L.L.P.

(57) ABSTRACT

The present invention relates to an aqueous coating composition comprising at least one binder (A) comprising at least one polymeric resin (A1), at least one pigment (B), and an aqueous dispersion of at least one thickener (C), where (C) is obtainable by a method comprising at least the steps (1), (2), (3), and (4), namely preparing a dispersion or solution of at least one polyurethane as a polymeric resin (C2) in at least one organic solvent (step (1)), preparing a mixture of the dispersion or solution obtained by step (1) and of a melt or solution of at least one polyamide as at least one polymeric resin (C1) having an acid number in a range from 1 to 200 mg of KOH per g of (C1) (step (2)), adding water to the mixture obtained by step (2) (step (3)), and removing the organic solvent from the mixture obtained by step (3), to give the aqueous dispersion of (C) (step (4)), to the use thereof for at least partly coating an optionally coated substrate with a basecoat film, to a coating method of this kind, and to a substrate coated accordingly.

13 Claims, No Drawings

AQUEOUS COATING COMPOSITION COMPRISING A THICKENER PREPARABLE FROM AT LEAST ONE POLYAMIDE AND AT LEAST ONE FURTHER POLYMER

The present invention relates to an aqueous coating composition comprising at least one binder (A) comprising at least one polymeric resin (A1), at least one pigment (B), and an aqueous dispersion of at least one thickener (C), where (C) is obtainable by a method comprising at least the steps (1), (2), (3), and (4), namely preparing a dispersion or solution of at least one polyurethane as a polymeric resin (C2) in at least one organic solvent (step (1)), preparing a mixture of the dispersion or solution obtained by step (1) and of a melt or solution of at least one polyamide as at least one polymeric resin (C1) having an acid number in a range from 1 to 200 mg of KOH per g of (C1) (step (2)), adding water to the mixture obtained by step (2) (step (3)), and removing the organic solvent from the mixture obtained by step (3), to give the aqueous dispersion of (C) (step (4)), to the use thereof for at least partly coating an optionally coated substrate with a basecoat film, to a coating method of this kind, and to a substrate coated accordingly.

Particularly in automotive finishing, but also in other areas where the desire is for coatings with good decorative effect and effective protection from corrosion at the same time, it is known practice to endow substrates with a plurality of coating films disposed one above another. Multicoat paint systems are applied here preferably by the "basecoat/clearcoat" process—that is, a pigmented basecoat material is applied first of all, and after a short flashing time, without a baking step (wet-on-wet process), a clearcoat material is applied over it. Basecoat and clearcoat are subsequently baked together. The "basecoat/clearcoat" process has become particularly important in the application of automotive metallic effect paints.

For reasons of economics and environment, there is a requirement to use aqueous coating compositions when applying such multicoat paint systems, especially when applying the basecoat film.

The coating compositions for producing these basecoat films ought to be processable by the aforementioned "wet-on-wet" process—that is, after an extremely short preliminary drying time without a baking step, it ought to be possible to apply a clearcoat film over them without, in so doing, causing defects to the appearance, such as pinholes, bits and/or flow defects, for example. In order at least to minimize such defects, suitable rheological assistants, among other agents, are commonly used in the coating compositions that are to be applied.

In the case of metallic effect paints of the basecoat/clearcoat type, moreover, there are further requirements to be met as well. The metallic effect is dependent critically on the orientation of the metal pigment particles within the coating film. A metallic effect basecoat material to be processed in the "wet-on-wet" process, accordingly, must yield coating films in which, following application, the metal pigments are present in a favorable spatial orientation, and in which this orientation becomes rapidly fixed in such a way that it cannot be disrupted in the course of the further finishing operation. Suitable variables for characterizing the metallic effect are the lightness of the hue, and the flop index.

EP 0 877 063 A2 discloses aqueous coating compositions which comprise a polyamide in order to ensure sufficient sedimentation stability of the pigments present in the compositions. A disadvantage of the presence of such a polyamide as sole rheological assistant in aqueous coating compositions, however, is the incidence of bits, in particular, in the course of processing by means of the "wet-on-wet" process.

EP 1 153 989 A1 discloses aqueous coating compositions which as well as a polyamide, such as the commercially available polyamide Disparlon® AQ-600, include as further rheological assistant a metal silicate such as the commercially available metal silicate Laponite® RD, for example. A disadvantage of the presence of such a metal silicate in aqueous coating compositions, especially in combination with polyamides specified in EP 1 153 989 A1, however, is often the incidence of pinholes and/or bits in the case of processing by means of the "wet-on-wet" process.

WO 2009/100938 A1 attempts to solve this problem by at least partly replacing the metal silicate with an acrylate thickener based on poly(meth)acrylic acid, such as a polyacrylic acid, for example. In addition to such a thickener, the coating compositions disclosed in that publication further comprise a polyamide such as the commercially available polyamide Disparlon® AQ-630, for example. A disadvantage of the coating compositions described in WO 2009/100938 A1, however, is the incidence of bits during incorporation of the polyamide into the coating compositions. Moreover, the coating compositions described in WO 2009/100938 A1 lack sufficient storage stability, particularly at relatively high temperatures, such as temperatures ≥40° C., for example. Furthermore, the use of the polyamides described in WO 2009/100938 A1 typically requires a high fraction of organic solvents, which is undesirable for environmental reasons.

There is therefore a demand for aqueous coating compositions, especially for coating compositions such as basecoat compositions, suitable for processing by means of the "wet-on-wet" process, that do not have the disadvantages identified above.

It is an object of the present invention, therefore, to provide a liquid coating composition, more particularly a liquid basecoat composition, which has advantages over the coating compositions known from the prior art. A particular object of the present invention is to provide a liquid coating composition, more particularly a liquid basecoat composition, which is notable for advantageous applications properties and which is less of an environmental concern than compositions typically employed, being, in particular, substantially free from organic solvents, with at the same time no adverse influence on the metallic effect of the coating composition.

This object is achieved by the subject matter claimed in the claims and also by the preferred embodiments of this subject matter that are described in the description hereinafter.

A first subject of the present invention, therefore, is an aqueous coating composition comprising
  at least one binder (A) comprising at least one polymeric resin (A1) and optionally at least one crosslinking agent (A2),
  at least one pigment (B), and
  an aqueous dispersion of at least one thickener (C),
  for at least partly coating an optionally coated substrate with a basecoat film,
  wherein the thickener (C) is obtainable by a method comprising at least the steps (1), (2), (3), and (4):
  (1) preparing a dispersion or solution of at least one polyurethane as polymeric resin (C2) in at least one organic solvent, (2) preparing a mixture of the dispersion or solution obtained by step (1) and of a melt or solution of at least one polyamide as at least one polymeric resin (C1), which has an acid number in the range from 1 to 200 mg of KOH per g of (C1), (3) adding water to the mixture obtained by step (2), and (4) removing the organic solvent from the mixture obtained by step (3), to give the aqueous dispersion of the at least one thickener (C).

A further subject of the present invention is an aqueous coating composition comprising at least one binder (A) comprising at least one polymeric resin (A1) and optionally at least one crosslinking agent (A2), at least one pigment (B), and an aqueous dispersion of at least one thickener (C), for at least partly coating an optionally coated substrate with a basecoat film, wherein the thickener (C) is obtainable by a method comprising at least the steps (1), (2), (3), and (4):

(1) preparing a dispersion or solution of at least one polymeric resin (C2) selected from the group consisting of polyurethanes, poly(meth)acrylates, and polyesters, and also mixtures thereof, in at least one organic solvent, (2) preparing a mixture of the dispersion or solution obtained by step (1) and of a melt or solution of at least one polyamide as at least one polymeric resin (C1), (3) adding water to the mixture obtained by step (2), and (4) removing the organic solvent from the mixture obtained by step (3), to give the aqueous dispersion of the at least one thickener (C).

It has surprisingly been found that the aqueous coating composition of the invention is suitable particularly in a "basecoat/clearcoat" process for applying a basecoat film to a substrate surface coated optionally with a priming coat, and can therefore be used as a basecoat coating composition.

It has further surprisingly been found that by virtue in particular of the presence of the specific thickener (C) used in accordance with the invention, it is possible to prevent the incidence of pinholes, bits, and flow defects, which are often observed when typical rheological assistants such as Laponite®, for example, are used in combination with polyamides, or polyamides are used alone, as thickeners.

It has surprisingly emerged, moreover, that by virtue in particular of the presence of the specific thickener (C) used in accordance with the invention, there is no adverse influence on the metallic effect of the coating composition when it is applied to a substrate, and the coating composition of the invention is notable in particular for a good flop index and good lightness.

Furthermore, the coating composition of the invention is distinguished by the fact that it is aqueous and hence less of an environmental concern than conventional coating compositions which comprise high fractions of organic solvents.

It has further been found, surprisingly, that the coating composition of the invention is notable in particular for good stability on storage even at relatively high temperatures, such as temperatures 240° C., for example.

The terms "pops", "pinholes", "flop", "bits", "sedimentation", and "flow defects" are known to the skilled person and defined for example in Römpp Lexikon, Lacke und Druckfarben, Georg Thieme Verlag 1998.

The term "comprising" in the sense of the present invention, in connection with the coating composition of the invention, for example, has in one preferred embodiment the meaning "consisting of". In this preferred embodiment, as well as the components water, (A), (B), and (C), it is possible optionally for there to be (D) and/or (E) and/or organic solvents present in the coating composition of the invention. All components here may in each case be present in their below-mentioned, preferred embodiments in the coating composition of the invention.

The fractions in wt % of the components present in the coating composition of the invention, namely water, (A), (B), and (C), optionally also (D) and/or (E) and/or organic solvents, add up preferably to 100 wt %, based on the total weight of the coating composition.

Coating Composition

The aqueous coating compositions of the invention comprise water as liquid diluent.

The term "aqueous" in connection with the coating composition of the invention refers preferably to liquid coating compositions which comprise as their liquid diluent, i.e., as the liquid solvent and/or dispersion medium, water as principal component. The aqueous coating compositions of the invention are therefore preferably substantially free from organic solvents. Optionally, however, the coating compositions of the invention may comprise organic solvents in said proportions. Examples of such organic solvents include heterocyclic, aliphatic or aromatic hydrocarbons, mono- or polyfunctional alcohols, ethers, esters, ketones, and amides, such as, for example, N-methylpyrrolidone, N-ethylpyrrolidone, dimethylformamide, toluene, xylene, butanol, ethyl glycol and butyl glycol and also their acetates, butyl diglycol, diethylene glycol dimethyl ether, cyclohexanone, methyl ethyl ketone, acetone, isophorone, or mixtures thereof. The fraction of these organic solvents is preferably at most 40.0 wt %, more preferably at most 35.0 wt %, very preferably at most 30.0 wt %, more particularly at most 25.0 wt %, based in each case on the total fraction of the liquid diluents—that is, liquid solvents and/or dispersion media— that are present in the coating composition of the invention. In this connection, the expression "substantially free from organic solvents" in connection with the coating composition of the invention means accordingly, preferably, that the fraction of organic solvents is at most 40.0 wt %, more preferably at most 35.0 wt %, very preferably at most 30.0 wt %, more particularly at most 25.0 wt %, based in each case on the total fraction of the liquid diluents—that is, liquid solvents and/or dispersion media—that are present in the coating composition of the invention. In particular, the expression "substantially free from organic solvents" in connection with the coating composition of the invention means that the fraction of organic solvents therein is at most in a range from 10.0 wt % to 35.0 wt %, based on the total fraction of the liquid diluents—that is, liquid solvents and/or dispersion media— that are present in the coating composition of the invention. The coating composition of the invention preferably comprises at most 25 wt %, more preferably at most 20 wt %, of organic solvent or of organic solvents, based on the total weight of the coating composition.

The coating composition of the invention is preferably a basecoat composition, i.e., a coating composition which is suitable for producing a basecoat film. The term "basecoat" is known to the skilled person and defined for example in Römpp Lexikon, Lacke und Druckfarben, Georg Thieme Verlag 1998.

The coating composition of the invention preferably has a solids fraction, i.e., a solids content, in the range from 10 to 50 wt %, more preferably in the range from 15 to 45 wt %, very preferably in the range from 15 to 50 wt %, based on the total weight of the coating composition. The skilled person is aware of methods for determining the solids fraction or solids content, i.e., the nonvolatile fraction. The nonvolatile fraction is determined in accordance with the method of determination described hereinafter.

Binder (A)

The binder (A) used in the aqueous coating composition of the invention is preferably a binder which is dispersed or dissolved in water.

The term "binder" refers in the sense of the present invention, in accordance with DIN EN ISO 4618 (German version, date: March 2007) preferably to those nonvolatile fractions of a coating composition that are responsible for film formation, with the exception of pigments (B) and any fillers present therein, more particularly to the polymeric resins that are responsible for film formation. The nonvolatile fraction may be determined in accordance with the method described below. The concept of the binder (A) consequently incorporates not only the polymeric resins (A1) but also, preferably, any crosslinking agents (A2) present in the respective coating composition. The thickener (C), however, is preferably not embraced by the concept of the binder (A).

Suitable polymeric resins (A1) are all customary polymeric resins (A1) known to the skilled person, such as self-crosslinking and nonself-crosslinking polymeric resins (A1). If nonself-crosslinking polymeric resins (A1) are used, the binder (A) used in accordance with the invention may further comprise a crosslinking agent (A2). Suitable polymeric resins (A1) including crosslinking agents (A2) present optionally are known from, for example, EP 0 228 003 A1, DE 44 38 504 A1, EP 0 593 454 B1, DE 199 48 004 A1, EP 0 787 159 B1, DE 40 09 858 A1, DE 44 37 535 A1, and WO 2005/021168 A1, more particularly from EP 0 228 003 A1, DE 199 48 004 A1, DE 40 09 858 A1, and DE 44 37 535 A1.

The binder (A) preferably comprises at least one polymeric resin (A1), which optionally has reactive functional groups which permit a crosslinking reaction.

The polymeric resin (A1) is preferably different from the polymeric resin (C1) used for preparing the inventively employed thickener (C); in other words, (A1) is preferably not a polyamide. The polymeric resin (A1) may be the same as or different from the polymeric resin (C2) used in preparing the inventively employed thickener (C). For example, a polyurethane may serve as polymeric resin (C2) both for preparing the thickener, and as polymeric resin (A1).

The polymeric resin (A1) in the binder (A1) used in accordance with the invention preferably has crosslinkable reactive functional groups. Any customary crosslinkable reactive functional group known to the skilled person is suitable in this context. The at least one polymeric resin in the binder (A) preferably has at least one kind of functional reactive groups selected from the group consisting of primary amino groups, secondary amino groups, hydroxyl groups, thiol groups, carboxyl groups, groups which have at least one C=C double bond, such as vinyl groups or (meth)acrylate groups, for example, and epoxide groups. The polymeric resin (A1) in the binder (A) preferably has functional hydroxyl groups.

For the purposes of the present invention, the expression "(meth)acrylic" or "(meth)acrylate" embraces in each case the definitions "methacrylic" and/or "acrylic" and "methacrylate" and/or "acrylate", respectively.

Where the polymeric resin (A1) in the binder (A) has crosslinkable functional groups such as hydroxyl groups, the fraction of crosslinkable functional groups such as hydroxyl groups is preferably in the range from 0.1 wt % to 7.0 wt %, more preferably from 0.25 to 6.5 wt %, very preferably from 0.50 to 6.0 wt %, more particularly from 0.75 to 5.5 wt %, based in each case on the total weight of the solids content of the polymeric resin (A1) in the binder (A).

The polymeric resin (A1) and the optionally present crosslinking agent (A2) are curable or crosslinkable exothermically or endothermically. The polymeric resin (A1) and the optionally present crosslinking agent (A2) are more particularly curable or crosslinkable thermally. The polymeric resin (A1) and the optionally present crosslinking agent (A2) are preferably curable or crosslinkable in a temperature range from −20° C. up to 250° C. The polymeric resin (A1) and the optionally present crosslinking agent (A2) are preferably crosslinkable at room temperature or at temperatures in the range from 15° C. to 80° C. Room temperature for the purposes of the present invention means preferably a temperature in the range from 18° C. to 23° C. Alternatively the polymeric resin (A1) and the optionally present crosslinking agent (A2) are crosslinkable only at higher temperatures, as for example at temperatures ≥80° C., more preferably ≥110° C., very preferably ≥140° C. or ≥150° C. With particular advantage the polymeric resin (A1) and the optionally present crosslinking agent (A2) are crosslinkable at 50 to 150° C., more preferably at 70 to 150° C., and very preferably at 80 to 150° C.

The binder (A) preferably comprises at least one polymeric resin (A1) selected from the group consisting of polyurethanes, polyesters, polyamides, polyureas, polystyrenes, polycarbonates, poly(meth)acrylates, vinyl ester-based resins, epoxy resins, phenyl-formaldehyde resins, melamine-formaldehyde resins, phenolic resins, and silicone resins, and also mixtures thereof, with preferably 70 to 100 wt % of the polymeric resin being selected from at least one of the aforementioned polymers. Among the stated polymers, the reference is preferably in each case both to homopolymers and to copolymers. These resins and also their preparation are known to the skilled person. Polyesters which are suitable are known from DE 40 09 858 A1, for example. Suitable polyurethanes are known from DE 199 48 004 A1 and from EP 0 228 003 A1, for example. The term "polyurethanes" preferably includes, in particular, polyurethane poly(meth)acrylates, i.e., polyurethane-modified poly(meth)acrylates. Such polyurethane poly(meth)acrylates are known to the skilled person from DE 44 37 535 A1, for example.

The binder (A) preferably comprises at least one polymeric resin (A1) selected from the group consisting of polyurethanes, polyureas, polyesters, and poly(meth)acrylates, with preferably 70 to 100 wt % of the polymeric resin in the binder being selected from at least one of the aforementioned polymers.

Also possible is the presence in the binder (A) of two or more different polymeric resins (A1), as for example two or three polymeric resins (A1) different from one another in each case.

In one particularly preferred embodiment, the binder (A) comprises, as polymeric resin (A1), at least one polyurethane, with preferably 70 to 100 wt % of the polymeric resin constituting such a polyurethane, and/or, as polymeric resin (A1), at least one poly(meth)acrylate, with preferably 70 to 100 wt % of the polymeric resin being selected from such a poly(meth)acrylate, and/or, as polymeric resin (A1), at least one polyester, with preferably 70 to 100 wt % of the polymeric resin being selected from such a polyester.

The binder (A) may comprise a polymeric resin (A1) which is cured or crosslinked with participation of isocyanate groups and/or oligomerized or polymerized isocyanate groups, very preferably at least one corresponding polyurethane and/or polyester and/or poly(meth)acrylate.

Where the binder (A) comprises at least one polyurethane as polymeric resin (A1), particular suitability is possessed by polyurethane-based resins which are prepared by a polyaddition reaction between hydroxyl-containing compounds such as polyols, including diols (such as, for example, hydroxyl groups of hydroxyl-containing polyesters or hydroxyl-containing polyethers and also mixtures and copolymers thereof) and at least one isocyanate or polyisocyanate (including aromatic and aliphatic isocyanates, di-, tri- and/or polyisocyanates). Normally this needs a stochiometric conversion of the OH groups of the polyols with the isocyanate groups of the polyisocyanates. However, the stochiometric ratio to be used may also be varied, since the polyisocyanate can be added to the polyol component in amounts such that there may be an "overcrosslinking" or an "undercrosslinking". Besides a reaction of isocyanate groups with OH groups, a further crosslinking reaction which may occur is, for example, the di- and trimerization of isocyanates (to form uretdiones or isocyanurates). Suitable polyisocyanates and isocyanates include all polyisocyanates and isocyanates, respectively, which can be employed and have been stated as crosslinking agents (A2).

Where the binder (A) comprises at least one polyurethane as polymeric resin (A1), it is suitably prepared using preferably a polyester polyol as prepolymer polyol component. Suitable polyester polyols include, in particular, compounds which derive from at least one polyol such as at least one diol, as for example ethylene glycol, propylene glycol (1,2-propanediol), trimethylene glycol (1,3-propanediol), neopentyl glycol, 1,4-butanediol and/or 1,6-hexanediol, or such as at least one triol such as 1,1,1-trimethylolpropane (TMP), and from at least one dicarboxylic acid such as, for example, adipic acid, terephthalic acid, isophthalic acid, ortho-phthalic acid and/or dimethylolpropionic acid and/or from at least one dicarboxylic acid derivative such as a dicarboxylic ester and/or a dicarboxylic anhydride such as phthalic anhydride. Especially preferred is a polyester polyol of this kind, used as prepolymer polyol component, which derives from at least one diol and/or triol selected from the group consisting of 1,6-hexanediol, neopentyl glycol, trimethylolpropane, and mixtures thereof, and from at least one dicarboxylic acid (or from at least one dicarboxylic acid derivative thereof) selected from the group consisting of adipic acid, terephthalic acid, isophthalic acid, ortho-phthalic acid, dimethylolpropionic acid, and mixtures thereof. Preference is given to using at least one such polyester polyol with at least one crosslinking agent (A2), more particularly with at least one polyisocyanate such as HDI or IPDI, for preparing the polyurethane resin which is encompassed by the binder (A).

In order to permit a solution or dispersion of a polyurethane resin and/or polyurea resin of this kind in water, it is usual to incorporate ionic and/or hydrophilic segments into the polyurethane and/or polyurea chain in order to stabilize the dispersion. Soft segments used in the case of polyurethanes may preferably be 20 to 100 mol % of relatively high molecular mass diols, based on the amount of all diols, preferably polyester diols, having a number-average molecular weight $M_n$ of 500 to 5000 g/mol, preferably of 1000 to 3000 g/mol. The number-average molecular weight is determined by the method described hereinafter.

Where the binder (A) comprises at least one poly(meth) acrylate-based polymeric resin, it is suitably prepared with, in particular, monomer mixtures or oligomer mixtures of esters such as $C_{1-6}$ alkyl esters of acrylic acid and/or of methacrylic acid. Polymer synthesis is accomplished via the reaction of the C—C double bonds of these monomers. The preparation of such poly(meth)acrylate-based resins may be accomplished by means of a radical polymerization, which is initiated, for example, by the decomposition of organic peroxides.

Where the binder (A), in addition to at least one polymeric resin (A1), further comprises at least one crosslinking agent (A2), suitability for such an agent is possessed by all customary crosslinking agents known to the skilled person, such as, for example, aminoplast resins, phenoplast resins, polyfunctional Mannich bases, melamine resins, benzoguanamine resins, beta-hydroxyalkylamides, tris(alkoxycarbonylamino)triazines, epoxides, free polyisocyanates and/or blocked polyisocyanates, especially blocked polyisocyanates, and also compounds having on average at least two groups capable of transesterification, examples being reaction products of malonic diesters and polyisocyanates, or of polyhydric alcohol esters and partial esters of malonic acid with monoisocyanates. A particularly preferred crosslinking agent is a blocked polyisocyanate. Where blocked polyisocyanates are selected as crosslinking agents, the aqueous coating composition of the invention is formulated preferably as a one-component composition (1-K). Where non-blocked polyisocyanates are selected as crosslinking agents, the aqueous coating composition of the invention is formulated preferably as a two-component composition (2-K).

Employable with particular preference as crosslinking agents (A2) are melamine resins that are dispersible or soluble in water, preferably melamine-formaldehyde condensation products, more particularly etherified melamine-formaldehyde condensation products. The solubility or dispersibility in water of these products is dependent not only on the degree of condensation—which is to be as low as possible—but also on the etherifying component, with only the lowest members in the alkanol or ethylene glycol monoether series producing water-soluble condensates. The greatest significance is possessed by methanol-etherified (methylated) melamine resins. When solubilizers are used as optional further additives, it is also possible for ethanol-, propanol- and/or butanol-etherified melamine resins, more particularly the corresponding etherified melamine-formaldehyde condensation products, to be dissolved or dispersed in aqueous phase.

Isocyanates used are preferably (hetero)aliphatic, (hetero) cycloaliphatic, (hetero)aromatic, or (hetero)aliphatic-(hetero)aromatic isocyanates. Preferred are diisocyanates which contain 2 to 36, more particularly 6 to 15, carbon atoms. Preferred examples are 1,2-ethylene diisocyanate, 1,4-tetramethylene diisocyanate, 1,6-hexamethylene diisocyanate (HDI), 2,2,4-(2,4,4)-trimethyl-1,6-hexamethylene diisocyanate (TMDI), diphenylmethane diisocyanate (MDI), 1,9-diisocyanato-5-methylnonane, 1,8-diisocyanato-2,4-dimethyloctane, 1,12-dodecane diisocyanate, ω,ω'-diisocyanatodipropyl ether, cyclobutene 1,3-diisocyanate, cyclohexane 1,3- and -1,4-diisocyanate, 3-isocyanatomethyl-3,5,5-trimethyl-cyclohexyl isocyanate (isophorone diisocyanate, IPDI), 1,4-diisocyanatomethyl-2,3,5,6-tetramethylcyclohexane, decahydro-8-methyl (1,4-methanonaphthalene-2 (or 3), 5-ylenedimethylene diisocyanate, hexahydro-4,7-methanoindane-1 (or 2), 5 (or 6) ylenedimethylene diisocyanate, hexahydro-4,7-methanoindane-1 (or 2), 5 (or 6) ylene diisocyanate, 2,4- and/or 2,6-hexahydrotoluylene diisocyanate (H6-TDI), 2,4- and/or 2,6-toluene diisocyanate (TDI), perhydro-2,4'-diphenylmethane diisocyanate, perhydro-4,4'-diphenylmethane diisocyanate ($H_{12}$MDI), 4,4'-diisocyanato-3,3',5,5'-tetramethyldicyclohexylmethane, 4,4'-diisocyanato-2,2',3,3',5,5',6,6'-octamethyldicyclohexylmethane, ω,ω'-diisocyanato-1,4-diethylbenzene, 1,4-diisocyanatomethyl-2,3,5,6-tetramethylbenzene, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclohexane, 1,4-diisocyanatomethylcyclohexane, tetramethylxylylene diisocyanate (TMXDI), 2,5(2,6)-bis(isocyanatomethyl)bicyclo[2.2.1]heptane (NBDI), and also any mixture of these compounds. Polyisocyanates of higher isocyanate functionality may also be used. Examples of such are trimerized hexamethylene diisocyanate and trimerized isophorone diisocyanate. Furthermore mixtures of polyisocyanates can also be utilized. The organic polyisocyanates suitable as crosslinking agents (A2) for the invention may also be prepolymers, deriving for example, from a polyol, including a polyether polyol or a polyester polyol. Utilized as blocked polyisocyanates may be any desired isocyanates wherein the isocyanate groups have been reacted with a compound, making the resultant blocked polyisocyanate particularly stable with respect to hydroxyl groups and amino groups such as primary and/or secondary amino groups at room temperature, in other words at a temperature of 18 to 23° C., but reacting at elevated temperatures, as for example at ≥80° C., more preferably ≥110° C., very preferably ≥130° C., and especially preferably ≥140° C., or at 90° C. to 300° C., or at 100 to 250° C., more preferably still at 125 to 250° C., and very preferably at 150 to 250°. For the blocking of the isocyanates it is possible with preference to use any desired suitable aliphatic, cycloaliphatic, or aromatic alkyl monoalcohols. Examples are the aliphatic alcohols, such as methyl, ethyl, chloroethyl, propyl, butyl, amyl, hexyl, heptyl, octyl, nonyl, 3,3,5-trimethylhexyl, decyl, and lauryl alcohol; cycloaliphatic alcohols, such as cyclopentanol and cyclohexanol; and aromatic alkyl alcohols, such as phenylcarbinol and methylphenylcarbinol. Other suitable blocking agents are hydroxylamines, such as ethanolamine, oximes, such as methyl ethyl ketone oxime, acetone oxime, and cyclohexanone oxime, and amines, such as dibutylamine and diisopropylamine.

The aqueous coating composition of the invention preferably comprises as crosslinking agent (A2) at least one optionally alkylated melamine-formaldehyde condensation product.

The crosslinking agent (A2) is preferably a crosslinking agent in dispersion or solution in water. To accelerate the crosslinking it is possible for suitable catalysts to be added to the aqueous coating composition. The skilled person also knows of such catalysts.

The aqueous coating composition of the invention preferably has a solids content, in terms of the at least one binder (A), in a range from 10 to 60 wt %, more preferably from 15 to 40 wt %, very preferably from 20 to 35 wt %, based in each case on the total weight of the aqueous coating composition.

The aqueous coating composition of the invention preferably comprises the crosslinking agent (A2) in an amount from 5 to 40 wt %, preferably in an amount from 10 to 35 wt %, more preferably in an amount from 15 to 30 wt %, based on the total weight of the polymeric resins (A1) in the coating composition. These quantity figures are based in each case on the respective solids content.

Pigment (B)

The coating composition of the invention comprises at least one pigment (B).

The pigment (B) is preferably in the form of a pigment (B) in dispersion or solution in water.

Particularly suitable as pigment (B) are organic and/or inorganic, coloring and/or extending pigments, and more particularly pigments which have preferably at least two of these properties.

In one preferred embodiment, the pigment (B) is an effect pigment or a mixture of at least one effect pigment and at least one pigment different therefrom which is not itself an effect pigment and which is selected preferably from the group consisting of organic and inorganic, coloring and extending pigments, and pigments which have preferably at least two of these properties.

A skilled person is familiar with the concept of effect pigments. A corresponding definition is found in, for example, Römpp Lexikon Lacke und Druckfarben, Georg Thieme Verlag, 1998. Effect pigments are preferably pigments which impart optical effect or color and optical effect, more particularly optical effect. A corresponding classification of the pigments is made according to DIN 55945 (Date: December 2011).

The pigment (B) is preferably selected from the group consisting of optionally coated organic or inorganic effect pigments.

More preferably the pigment (B) is selected from the group consisting of optionally coated metallic effect pigments, optionally coated metal oxide effect pigments, optionally coated effect pigments composed of metals and nonmetals, and optionally coated nonmetallic effect pigments.

Very preferably indeed the pigment (B) is selected from the group consisting of metallic effect pigments, silicate-coated metallic effect pigments, and optionally coated nonmetallic effect pigments such as pearlescent pigments, more particularly mica pigments. With more particular preference the pigment (B) is selected from the group consisting of metallic effect pigments and silicate-coated metallic effect pigments.

Examples of preferred metallic effect pigments are aluminum effect pigments, iron effect pigments, or copper effect pigments. Especially preferred are optionally coated—such as, for example, silanized and/or chromated—aluminum effect pigments, more particularly commercially available products from Eckart such as Stapa® Hydrolac, Stapa® Hydroxal, Stapa® Hydrolux and Stapa® Hydrolan, most preferably Stapa® Hydrolux and Stapa® Hydrolan.

The effect pigments (B) used in accordance with the invention may be in any customary form known to the skilled person, such as a leaflet form and/or a platelet form, for example, more particularly a (corn)flake form or a silver dollar form.

Examples of effect pigments composed of metals and nonmetals are aluminum pigments coated with iron oxide, as described in European patent application EP 0 562 329 A2, for example, glass leaflets coated with metals, more particularly with aluminum, or interference pigments which include a reflector layer made of metal, more particularly aluminum.

Examples of nonmetallic effect pigments are pearlescent pigments, more particularly mica pigments, graphite pigments which are coated with metal oxides and have a platelet form, for example, interference pigments which do not include a metal reflector layer and which exhibit a strong color flop, effect pigments based on iron oxide, or organic, liquid-crystalline effect pigments.

For further details regarding the effect pigments employed preferably in accordance with the invention as pigment (B), refer to Römpp Lexikon Lacke und Druckfarben, Georg Thieme Verlag, 1998, pages 176, "Effect pigments" and pages 380 and 381, "metal oxide-mica pigments" to "metal pigments".

Pigments suitable as pigment (B) that are not effect pigments are preferably selected from the group consisting of organic and inorganic, coloring and extending pigments, pigments which have preferably at least two of these properties, and nanoparticles. Examples of suitable inorganic coloring pigments are white pigments such as titanium dioxide, zinc white, zinc sulfide or lithopone; black pigments such as carbon black, iron manganese black, or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chromium orange; or yellow iron oxide, nickel titanium yellow, chromium titanium yellow, cadmium sulfide, cadmium zinc sulfide, chromium yellow or bismuth vanadate. Examples of suitable organic coloring pigments are monoazo pigments, disazo pigments, anthraquinone pigments, benzimidazole pigments, quinoacridone pigments, quinophthalone pigments, diketopyrrolopyrrol pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black. Examples of suitable extending pigments or fillers are chalk, calcium sulfate, barium sulfate, silicates such as talc or kaolin, silicas, oxides such as aluminum hydroxide or magnesium hydroxide, or organic fillers such as textile fibers, cellulose fibers, polyethylene fibers, or polymer powders; for further details, refer to Römpp Lexikon Lacke und Druckfarben, Georg Thieme Verlag, 1998, pages 250 ff., "fillers". The nanoparticles are preferably selected from the group consisting of main and transition group metals and their compounds. The main and transition group metals are preferably selected from metals from main groups three to five, from transition groups three to six and also one and two, of the Periodic Table of the Elements, and also from the lanthanides. Particularly preferred for use are boron, aluminum, gallium, silicon, germanium, tin, arsenic, antimony, silver, zinc, titanium, zirconium, hafnium, vanadium, niobium, tantalum, molybdenum, tungsten, and cerium, more particularly aluminum, silicon, silver, cerium, titanium, and zirconium. The compounds of the metals are preferably the oxides, oxide hydrates, sulfates, or phosphates. Preference is given to using silver, silicon dioxide, aluminum oxide, aluminum oxide hydrate, titanium dioxide, zirconium oxide, cerium oxide, and mixtures thereof, more preferably silver, cerium oxide, silicon dioxide, aluminum oxide hydrate and mixtures thereof, very preferably aluminum oxide hydrate, and more particularly boehmite. These nanoparticles preferably have an average primary particle size <50 nm, more preferably 5 to 50 nm, especially 10 to 30 nm. The primary particle size here is determined preferably by means of laser diffraction, more preferably by means of laser granulometry in accordance with ISO 13320-1 (Date: September 2009).

The amount of the inventively employed pigment (B) in the coating composition of the invention may vary very widely according to the inventive use of the pigmented coating composition in question. The amount of pigment (B), based on the coating composition of the invention, is preferably 0.1 to 80 wt %, more preferably 0.5 to 70 wt %, very preferably 1.0 to 60 wt %, especially preferably 1.5 to 50 wt %, and more particularly 2.0 to 40 wt %.

Thickener (C)

The coating composition of the invention comprises at least one thickener (C) which is obtainable by a method comprising at least the steps (1), (2), (3), and (4):

(1) preparing a dispersion or solution of at least one polymeric resin (C2) selected from the group consisting of polyurethanes, poly(meth)acrylates, and polyesters, and also mixtures thereof, preferably of at least one polyurethane as a polymeric resin (C2) in at least one organic solvent, (2) preparing a mixture of the dispersion or solution obtained by step (1) and of a melt or solution of at least one polyamide as at least one polymeric resin (C1), which preferably has an acid number in a range from 1 to 200 mg of KOH per g of (C1), (3) adding water to the mixture obtained by step (2), and (4) removing the organic solvent from the mixture obtained by step (3), to give the aqueous dispersion of the at least one thickener (C).

The thickener preferably comprises a blend of the at least one polyamide (C1) and the at least one further polymer (C2) selected from the group consisting of polyurethanes, poly(meth)acrylates, and polyesters especially preferably at least one polyurethane. The blend in this case is therefore preferably a corresponding polymer blend. The term "blend" or "polymer blend" is known to the skilled person, from Römpp Chemie Lexikon 1995, Thieme Verlag, for example.

The relative weight ratio of (C1) to (C2), based in each case on their solids content, is preferably in the range from 1:15 to 1:1, more preferably in the range from 1:10 to 1:1.5, very preferably in the range from 1:10 to 1:1.7.

The method preferably further comprises step (2a), which is carried out between steps (2) and (3), and which is an at least partial neutralization of the intermediate obtained by step (2), by the addition of at least one neutralizing agent, such as, for example, of at least one suitable amine, optionally containing OH groups, and being able to carry 1 to 12 carbon atoms, for example. An example of such an amine is dimethylethanolamine. Alternatively, a preferably at least partial neutralization of this kind, of the intermediate obtained by step (2), may also take place within step (3), by the addition in step (3) not only of water but also of at least one neutralizing agent to the mixture obtained by step (2).

In step (1) it is possible to use in principle any suitable organic solvent. Examples of such organic solvents include heterocyclic, aliphatic, or aromatic hydrocarbons, mono- or polyfunctional alcohols, ethers, esters, ketones, and amides, such as, for example, N-methylpyrrolidone, N-ethylpyrrolidone, dimethylformamide, toluene, xylene, butanol, ethyl glycol and butyl glycol and also their acetates, butyl diglycol, diethylene glycol dimethyl ether, cyclohexanone, methyl ethyl ketone (MEK), methyl isobutyl ketone (MIBK), acetone, isophorone, or mixtures thereof, especially methyl ethyl ketone (MEK) and/or methyl isobutyl ketone (MIBK).

Step (1) and/or step (2) and/or step (2a) are carried out preferably at a temperature in the range from 60 to 180° C., more particularly at a temperature in the range from 90 to 150° C.

Preferably, in step (2), the dispersion or solution obtained by step (1) is introduced initially, and is admixed with the melt or solution, preferably melt, of the at least one polymeric resin (C1), i.e., of the polyamide (C1). An alternative option is to introduce initially the melt or solution, preferably melt, of the at least one polymeric resin (C1), i.e., of the polyamide (C1), and to admix it with the dispersion or solution obtained by step (1).

In step (3), deionized water is preferably employed. The mixture obtained by step (3) is preferably a dispersion. This dispersion may be produced using any customary type of dispersing known to the skilled person. Step (3) takes place preferably by stirring, more preferably by means of high-performance dispersing apparatus such as a corresponding Ultra-Turrax apparatus from IKA, for example. Optionally, in step (3), as well as water, it is also possible to add at least one neutralizing agent to the mixture obtained by step (2), especially when no separate step (2a) is carried out.

Step (4) may take place, for example, by application of a reduced pressure or by distillative removal at elevated temperature and/or under reduced pressure. The aqueous dispersion of the thickener (C) that is obtained by step (4) may optionally include, on the basis of the solution or dispersion containing solvent that was used in step (1), a small fraction of organic solvent such as, for example, MEK and/or MIBK, this fraction nevertheless preferably being at most in a range from 0.2 to 1.5 wt %, more preferably from 0.2 to 1.0 wt %, very preferably from 0.2 to 0.6 wt %, based in each case on the total weight of the aqueous dispersion of the thickener (C).

The polyamide (C1) used in step (2) is obtained preferably by a step (0), namely:

(0) by reacting at least one polycarboxylic acid (C1a), preferably at least one polycarboxylic acid selected from the group consisting of aliphatic $C_3$-$C_{22}$ dicarboxylic acids, polymers such as dimers and trimers of aliphatic C14-$C_{22}$ monocarboxylic acids, and mixtures thereof, with at least one polyamine (C1b), preferably with at least one aliphatic $C_2$-$C_{12}$ diamine (C1b), where the reaction product obtained by step (0) is optionally contacted subsequently with at least one preferably basic neutralizing agent. This contacting takes place preferably with at least one preferably basic neutralizing agent.

The coating composition of the invention preferably has a solids content, in terms of the at least one thickener (C), in a range from 0.1 to 20 wt %, more preferably from 0.35 to 15 wt %, very preferably from 0.75 to 10 wt %, more particularly from 1.0 to 9.0 wt %, based in each case on the total weight of the coating composition.

The thickener (C) preferably comprises the at least one polyamide (C1) in an amount in a range from 10 to 50 wt % and the at least one further polymer (C2) in an amount in a range from 50 to 90 wt %, based on the total weight of the thickener. The thickener (C) preferably comprises the at least one polyamide (C1) in an amount in a range from 10 to 40 wt % and the at least one further polymer (C2) in an amount in a range from 60 to 90 wt %, based on the total weight of the thickener. These amounts are based in each case on the solids content.

The thickener (C) employed in accordance with the invention preferably has a melting point in the range from 20° C. to 100° C., more preferably in a range from 25° C. to 80° C.

Polyamide (C1)

The polyamide of the invention (C1) that is used is obtainable preferably by reaction of at least one polycarboxylic acid (C1a) of at least one polyamine (C1b), preferably according to step (0) described above.

The term "polycarboxylic acid" refers in the sense of the present invention preferably also to corresponding polycarboxylic acid derivatives which can be used for preparing the polyamide (C1), examples being corresponding polycarboxylic esters and/or polycarboxylic anhydrides.

The term "polycarboxylic acid" (C1a) for the purposes of the present invention encompasses preferably a carboxylic acid which has two or more carboxyl groups, as for example 2, 3, 4, 5, or 6 carboxyl groups. Polycarboxylic acid more preferably has 2 or 3 carboxyl groups. Polycarboxylic acids with two carboxyl groups are dicarboxylic acids, and polycarboxylic acids with three carboxyl groups are tricarboxylic acids. The inventively employed polycarboxylic acids (C1a) may be aromatic, semiaromatic, cycloaliphatic, semicycloaliphatic, or aliphatic, preferably aliphatic.

The inventively employed polycarboxylic acids (C1a) preferably have 4 to 66 carbon atoms per molecule.

With particular preference the polycarboxylic acid (C1a) used in preparing the inventively employed polyamide (C1) is selected from the group consisting of aliphatic $C_3$-$C_{22}$ dicarboxylic acids, polymers, more particularly dimers and trimers, of aliphatic $C_{14}$-$C_{22}$ monocarboxylic acids, and mixtures thereof. Very preferably, the polycarboxylic acid (C1a) used in preparing the inventively employed polyamide (C1) is selected from the group consisting of aliphatic $C_3$-$C_{22}$ dicarboxylic acids, dimers of aliphatic $C_{14}$-$C_{22}$ monocarboxylic acids, and mixtures thereof.

The term "aliphatic $C_3$-$C_{22}$ dicarboxylic acid" refers in the sense of the present invention preferably to a saturated or unsaturated, preferably saturated, aliphatic $C_3$-$C_{22}$ dicarboxylic acid having a total of 3-22, i.e., 3, 4, 5, 6, 7, 8, 9, 10, 11, 12, 13, 14, 15, 16, 17, 18, 19, 20, 21, or 22 carbon atoms, preferably an aliphatic $C_3$-$C_{20}$ dicarboxylic acid having a total of 3 to 20, i.e., 3, 4, 5, 6, 7, 8, 9, 10, 11, 12, 13, 14, 15, 16, 17, 18, 19, or 20 carbon atoms, having in each case precisely two —C(=O)—OH groups, i.e., for example, an aliphatic $C_3$-$C_{22}$ dicarboxylic acid which as well as these two —C(=O)—OH groups has a C1-$C_{20}$ aliphatic radical having a total of 1 to 20 carbon atoms. The expression "aliphatic" here encompasses preferably acyclic saturated or unsaturated, preferably unsaturated, branched or unbranched aliphatic radicals. To the skilled person it is clear that an unsaturated bond within the $C_3$-$C_{22}$ dicarboxylic acid is possible only for $C_4$-$C_{22}$ dicarboxylic acids. Unsaturated aliphatic radicals in this context have at least one, preferably 1, 2, 3, 4, or 5, more preferably 1, 2, 3, or 4, very preferably 1, 2, or 3 carbon double bond(s). The aliphatic $C_3$-$C_{22}$ dicarboxylic acids may be natural or synthesized dicarboxylic acids. The aliphatic $C_3$-$C_{22}$ dicarboxylic acids may optionally be substituted one or more times, as for example two, three, four, or five times, preferably by at least one substituent selected from the group consisting of OH, O—$C_{1-4}$ aliphatic radicals, =O, $NH_2$, NH($C_{1-4}$ aliphatic radicals), N($C_{1-4}$ aliphatic radicals), it being possible for substitution to be on the same or on different carbon atoms. Preference is given to aliphatic $C_3$-$C_{22}$ dicarboxylic acids selected from the group consisting of malonic acid, succinic acid, glutaric acid, adipic acid, pimelic acid, suberic acid, azelaic acid, sebacic acid, undecanedicarboxylic acid, dodecanedicarboxylic acid, tridecanedicarboxylic acid, tetradecanedicarboxylic acid, and hexadecanedicarboxylic acid.

The term "aliphatic $C_{14}$-$C_{22}$ monocarboxylic acid" is understood in the sense of the present invention to refer preferably to a saturated or unsaturated, preferably unsaturated, aliphatic $C_{14}$-$C_{22}$ monocarboxylic acid having a total of 14-22, i.e., 14, 15, 16, 17, 18, 19, 20, 21, or 22 carbon atoms, preferably an aliphatic $C_{16}$-$C_{20}$ monocarboxylic acid having a total of 16-20, i.e., 16, 17, 18, 19, or 20 carbon atoms, having in each case exactly one —C(=O)—OH group, i.e., an aliphatic $C_{14}$-$C_{22}$ monocarboxylic acid which as well as this one —C(=O)—OH group has a $C_{13}$-$C_{21}$ aliphatic radical having a total of 13-21, i.e., 13, 14, 15, 16, 17, 18, 19, 20, or 21 carbon atoms, preferably a $C_{15}$-$C_{19}$ aliphatic radical having a total of 15-19, i.e., 15, 16, 17, 18, or 19 carbon atoms. The expression "aliphatic" here encompasses preferably acyclic saturated or unsaturated, preferably unsaturated, branched or unbranched aliphatic radicals. Unsaturated aliphatic radicals here have at least one, preferably 1, 2, 3, 4, or 5, more preferably 1, 2, 3, or 4, very preferably 1, 2, or 3, carbon double bond(s). The aliphatic $C_{14}$-$C_{22}$ monocarboxylic acids may be natural or synthesized fatty acids. The aliphatic $C_{14}$-$C_{22}$ monocarboxylic acids may optionally be substituted one or more times, as for example two, three, four or five times, preferably by at least one substituent selected from the group consisting of OH, O—$C_{1-4}$ aliphatic radicals, =O, $NH_2$, $NH(C_{1-4}$ aliphatic radicals), $N(C_{1-4}$ aliphatic radicals), it being possible for the substitution to be on the same or on different carbon atoms. Preference is given to aliphatic $C_{14}$-$C_{22}$ monocarboxylic acids selected from the group consisting of myristic acid, pentadecanoic acid, palmitic acid, margaric acid, stearic acid, nonadecanoic acid, arachidic acid, henicosanoic acid, docosanoic acid, myristoleic acid, palmitoleic acid, petroselinic acid, oleic acid, elaideic acid, vaccenic acid, gadoleic acid, icosenoic acid, cetoleic acid, erucic acid, linoleic acid, linolenic acid, calendulic acid, punicic acid, elaeostearic acid, arachidonic acid, timnodonic acid, clupanodonic acid, and cervonic acid. Preference is given to aliphatic $C_{16}$-$C_{20}$ monocarboxylic acids selected from the group consisting of palmitic acid, margaric acid, stearic acid, nonadecanoic acid, arachidic acid, palmitoleic acid, petroselinic acid, oleic acid, elaidic acid, vaccenic acid, gadoleic acid, icosenoic acid, linoleic acid, linolenic acid, calendulic acid, punicic acid, elaeostearic acid, arachidonic acid, and timnodonic acid. Preference is given to aliphatic $C_{18}$ monocarboxylic acids selected from the group consisting of stearic acid, petroselinic acid, oleic acid, elaidic acid, vaccenic acid, linoleic acid, linolenic acid, calendulic acid, punicic acid, and elaeostearic acid, more particularly selected from the group consisting of stearic acid, oleic acid, linolic acid, and linolenic acid, most preferably selected from the group consisting of oleic acid, linoleic acid, and linolenic acid.

Known to the skilled person are preparation processes for providing polymers, more particularly dimers and trimers, of aliphatic $C_{14}$-$C_{22}$ monocarboxylic acids, i.e., for providing polymerized aliphatic $C_{14}$-$C_{22}$ monocarboxylic acids, such as, for example, dimerized, trimerized, and more highly polymerized aliphatic $C_{14}$-$C_{22}$ monocarboxylic acids, from DE 25 06 211 A1, U.S. Pat. Nos. 2,793,219 A, and 2,955,121 A, for example. The polymerized aliphatic $C_{14}$-$C_{22}$ monocarboxylic acids may optionally be substituted one or more times, as for example two, three, four, or five times, preferably by at least one substituent selected from the group consisting of OH, O—$C_{1-4}$ aliphatic radicals, =O, $NH_2$, $NH(C_{1-4}$ aliphatic radicals), $N(C_{1-4}$ aliphatic radicals), it being possible for the substitution to be on the same or on different carbon atoms. Starting material used for preparing such polymerized aliphatic $C_{14}$-$C_{22}$ monocarboxylic acids are at least monounsaturated aliphatic $C_{14}$-$C_{22}$ monocarboxylic acids. The polymerized, such as dimerized and trimerized, aliphatic $C_{14}$-$C_{22}$ monocarboxylic acids obtained may in each case be separated by distillation from one another and also from higher polyvalent polymerization products, and may be subjected, optionally, to further conversion reactions, such as hydrogenations, for example.

The term "polyamine" (C1b) in the sense of the present invention refers preferably to a compound which has at least two, preferably terminal, primary amino groups. In total, however, a polyamine may have up to and including 10 amino groups—that is, in addition to the at least two primary amino groups, it may also have up to and including 8 further amino groups, which are preferably primary or secondary amino groups. A "polyamine" in the sense of the present invention may be a (hetero)aliphatic, (hetero)cycloaliphatic, or (hetero)aromatic polyamine. The polyamine is preferably a diamine or triamine, more preferably a diamine. The inventively employed polyamines (C1b) preferably have 2 to 20, more preferably 2 to 12, carbon atoms per molecule. The polyamine may optionally be substituted one or more times, as for example two, three, four, or five times, preferably by at least one substituent selected from the group consisting of OH, O—$C_{1-4}$ aliphatic radicals, =O, $NH_2$, $NH(C_{1-4}$ aliphatic radicals), $N(C_{1-4}$ aliphatic radicals), it being possible for the substitution to be on the same or on different carbon atoms.

Very preferably, the polyamine (C1b) used to prepare the polyamide (C1) employed inventively is selected from the group consisting of aliphatic $C_2$-$C_{20}$ diamines. Very preferably, the polyamine (C1b) used to prepare the polyamide (C1) employed inventively is selected from the group consisting of aliphatic $C_2$-$C_{12}$ diamines.

The term "aliphatic $C_2$-$C_{20}$ diamine" refers in the sense of the present invention preferably to a saturated or unsaturated, preferably a saturated, aliphatic $C_2$-$C_{20}$ diamine having a total of 2-20, i.e., 2, 3, 4, 5, 6, 7, 8, 9, 10, 11, 12, 13, 14, 15, 16, 17, 18, 19, or 20, carbon atoms, preferably an aliphatic $C_2$-$C_{12}$ diamine having a total of 2-12, i.e., 2, 3, 4, 5, 6, 7, 8, 9, 10, 11, or 12, carbon atoms, and having in each case precisely two, preferably terminal, —$NH_2$ groups. The expression "aliphatic" here encompasses preferably acyclic saturated or unsaturated, preferably saturated, branched or unbranched aliphatic radicals. Unsaturated aliphatic radicals in this context have at least one, preferably 1, 2, 3, 4, or 5, more preferably 1, 2, 3, or 4, very preferably 1, 2, or 3 carbon double bond(s). The aliphatic $C_2$-$C_{20}$ diamine may optionally be substituted one or more times, as for example two, three, four, or five times, preferably by at least one substituent selected from the group consisting of OH, O—$C_{1-4}$ aliphatic radicals, =O, $NH_2$, $NH(C_{1-4}$ aliphatic radicals), $N(C_{1-4}$ aliphatic radicals), it being possible for the substitution to be on the same or on different carbon atoms. The aliphatic $C_2$-$C_{20}$ diamines are preferably selected from the group consisting of ethylenediamine, 1,3-diaminopropane, 1,4-diaminobutane, 1,5-diaminopentane, 1,6-diaminohexane (hexamethylenediamine), 1,7-diaminoheptane, 1,8-diaminoctane (octamethylenediamine), 1,9 diaminononane, 1,10-diaminodecane, 1,11-diaminoundecane, and 1,12-diaminododecane.

The polyamide (C1) is preferably obtainable by reaction of at least one polycarboxylic acid (C1a) selected from the group consisting of aliphatic $C_3$-$C_{22}$ dicarboxylic acids, polymers such as dimers and trimers of aliphatic $C_{14}$-$C_{22}$ monocarboxylic acids, and mixtures thereof, with at least one aliphatic $C_2$-$C_{12}$ diamine (C1b).

The reaction of at least one polycarboxylic acid (C1a) and at least one polyamine (C1b) is carried out preferably in a solvent, which is preferably an organic solvent.

The polyamide (C1) is preferably prepared using, per amino group of the polyamine used as component (C1b), more particularly of the aliphatic $C_2$-$C_{12}$ diamine, at least 1.0 mol, more preferably at least 1.1 mol, very preferably at least 1.2 mol or at least 1.4 mol, of polycarboxylic acid (C1a), more particularly of polycarboxylic acid (C1a) selected from the group consisting of aliphatic $C_3$-$C_{22}$ dicarboxylic acids and dimers of aliphatic $C_{14}$-$C_{22}$ monocarboxylic acids.

Where, for example, 1 mol of an aliphatic $C_2$-$C_{12}$ diamine is used as component (C1b), in this case at least 1.0 mol, more preferably at least 1.1 mol, very preferably at least 1.2 mol or at least 1.4 mol, of polycarboxylic acid (C1a) selected from the group consisting of aliphatic $C_3$-$C_{22}$ dicarboxylic acids and dimers of aliphatic $C_{14}$-$C_{22}$ monocarboxylic acids is used for preparing the polyamide (C1).

The polyamide (C1) preferably has an acid number in the range from 1 to 200 mg, more preferably from 20 to 120 mg, very preferably from 30 to 100 mg of KOH per g of (C1). The skilled person is aware of methods for determining the acid number. The acid number is determined preferably to DIN EN ISO 2114 (date: June 2002).

The acid number of the inventively employed polyamides (C1) may be controlled and adjusted in particular by contacting and reacting the polyamide (C1) obtained after the reaction, with at least one neutralizing agent, preferably via the amount of neutralizing agent used. Corresponding suitable, preferably basic, neutralizing agents are known to the skilled person. One preferred neutralizing agent is an amino alcohol, suitability being possessed with particular preference by dimethylethanolamine (DMEA).

The polyamide (C1) is preferably obtainable by a method comprising at least the step (0), namely:

(0) by reacting at least one polycarboxylic acid (C1a), preferably at least one polycarboxylic acid selected from the group consisting of aliphatic $C_3$-$C_{22}$ dicarboxylic acids, polymers such as dimers and trimers of aliphatic $C_{14}$-$C_{22}$ monocarboxylic acids, and mixtures thereof, with at least one polyamine (C1b), preferably with at least one aliphatic $C_2$-$C_{12}$ diamine (C1b), where the reaction product obtained by step (0) is optionally contacted subsequently with at least one preferably basic neutralizing agent. The acid number of the reaction product obtained by step (0) may be adjusted or reduced by reaction of free carboxyl groups with the neutralizing agent. The at least one neutralizing agent is used preferably in an amount such that 60 to 90 mol %, more preferably 70 to 90 mol % or 75 to 85 mol %, of the free carboxyl groups are neutralized.

The inventively employed polyamide (C1) preferably has a number-average molecular weight in a range from 500 g/mol to 20 000 g/mol. The skilled person is aware of methods for determining the number-average molecular weight. The number-average molecular weight is determined by the method described hereinafter.

The inventively employed polyamide (C1) preferably has a melting point in the range from 80° C. to 180° C., more preferably in a range of from 100° C. to 170° C., very preferably in the range from 120° C. to 160° C.

Polymer (C2)

As polymeric resin (C2) which is used for preparing the thickener (C), preference is given to using a polymeric resin selected from the group consisting of polyurethanes, poly(meth)acrylates, and polyesters, and also mixtures thereof. Polyurethanes, poly(meth)acrylates, and polyesters which can be used for preparing the thickener (C) include the same, corresponding polymers also suitable for preparing the polymeric resin (A1).

The further polymer (C2) is preferably at least one polyurethane and/or at least one poly(meth)acrylate, more preferably at least one polyurethane.

The polymer (C2), more preferably the polyurethane, preferably has an acid number in a range from 1 to 30 mg of KOH per g of (C2).

Polyurethanes which can be used as component (C2) are described in EP 0 228 003 A1, for example.

Further Thickener (D)

The coating composition of the invention may optionally comprise at least one further thickener (D), different from component (C), such as, for example, at least one thickener (D) selected from the group consisting of metal silicates, thickeners based on poly(meth)acrylic acid, thickeners based on polyurethanes, polymeric waxes, and mixtures thereof.

The metal silicate is selected preferably from the group of the smectites. With particular preference the smectites are selected from the group of montmorillonites and hectorites. The montmorillonites and hectorites are selected more particularly from the group consisting of aluminum magnesium silicates and also sodium magnesium and sodium magnesium fluorine lithium phyllosilicates. These inorganic phyllosilicates are sold under the brand name Laponite®.

Thickeners based on poly(meth)acrylic acid are optionally crosslinked and/or neutralized with a suitable base. Examples of such thickeners based on poly(meth)acrylic acid are "Alkali Swellable Emulsions" (ASE), and hydrophobically modified variants of these, the "Hydrophilically modified Alkali Swellable Emulsions" (HASE). Thickeners based on poly(meth)acrylic acid are preferably anionic. Corresponding products such as Rheovis® AS 1130 are available commercially.

Thickeners based on polyurethanes are optionally crosslinked and/or neutralized with a suitable base. Corresponding products such as Rheovis® PU 1250 are available commercially. Where at least one polyurethane is used as polymer (C2), the polyurethane-based thickener is preferably different from this polymer (C2). Where at least one polyurethane is used as polymeric resin (A1), the polyurethane-based thickener is preferably different from this polymeric resin (A1).

Examples of suitable polymeric waxes include optionally modified polymeric waxes based on ethylene-vinyl acetate copolymers. Corresponding products are available commercially, for example, under the Aquatix® name.

Where the coating composition of the invention comprises at least one further thickener (D), the relative weight ratio of the thickener (C) in the coating composition of the invention to the further thickener (D) is preferably in the range from 100:1 to 1:1, more preferably from 80:1 to 1:1. All figures are based on the solids content of the components.

Where component (D) is a metal silicate, the relative weight ratio of the thickener (C) in the coating composition of the invention to component (D) is preferably in a range from 50:1 to 5:1, more preferably in a range from 45:1 to 6:1. Where component (D) is a thickener based on poly(meth)acrylic acid, the relative weight ratio of the thickener (C) in the coating composition of the invention to component (D) is preferably in a range from 85:1 to 1:1, more preferably in a range from 80:1 to 1:1. Where component (D) is a thickener based on a polymeric wax, the relative weight ratio of the thickener (C) in the coating composition of the invention to component (D) is preferably in a range from 35:1 to 5:1, more preferably in a range from 30:1 to 7:1. All figures are based on the solids content of the components.

The at least one metal silicate as further thickener (D) is preferably present in the coating composition of the invention in an amount in a range from 2.5 to 10 wt %, more preferably in a range from 4.5 to 8 wt %, based on the solids content of the polymeric resin (A1). The at least one metal silicate as further thickener (D) is preferably present in the coating composition of the invention in an amount in a range from 1.5 to 8 wt %, more preferably in a range from 2.0 to 7 wt %, based on the total solids content of the coating composition.

Additive (E)

The coating composition of the invention, depending on its desired application, may comprise one or more customarily employed additives as component (E). These additives (E) are preferably selected from the group consisting of antioxidants, antistats, wetting agents, dispersants, emulsifiers, flow control assistants, solubilizers, defoaming agents, wetting agents, stabilizing agents, preferably heat stabilizers and/or thermal stabilizers, in-process stabilizers, and UV and/or light stabilizers, photoprotectants, deaerating agents, inhibitors, catalysts, waxes, wetting agents, dispersants, flexibilizing agents, flame retardants, reactive diluents, carrier media, resins, waxes, hydrophobizing agents, hydrophilizing agents, impact modifiers, expandants, process auxiliaries, plasticizers, and mixtures of the aforementioned further additives. The amount of additive (E) in the coating composition of the invention may vary. The amount, based on the total weight of the coating composition of the invention, is preferably 0.01 to 20.0 wt %, more preferably 0.05 to 18.0 wt %, very preferably 0.1 to 16.0 wt %, especially preferably 0.1 to 14.0 wt %, more particularly 0.1 to 12.0 wt %, and most preferably 0.1 to 10.0 wt %.

Method for Producing the Aqueous Coating Composition

The present invention further provides a method for producing the coating composition of the invention.

The coating composition of the invention may be prepared by first preparing an aqueous dispersion of a thickener (C) which is obtainable by a method comprising at least the steps (1), (2), (3), and (4):

(1) preparing a dispersion or solution of at least one polymeric resin (C2) selected from the group consisting of polyurethanes, poly(meth)acrylates, and polyesters, and also mixtures thereof, preferably at least one polyurethane as a polymeric resin in at least one organic solvent, (2) preparing a mixture of the dispersion or solution obtained by step (1) and of a melt or solution, preferably melt, of at least one polyamide as at least one polymeric resin (C1), which preferably has an acid number in a range from 1 to 200 mg of KOH per g of (C1), (3) adding water to the mixture obtained by step (2), and (4) removing the organic solvent from the mixture obtained by step (3), to give the aqueous dispersion of the at least one thickener (C).

Optionally it is possible between step (2) and step (3), as described above, to carry out a step (2a).

Following this, the resulting aqueous dispersion of the thickener (C), as a component, is mixed with the further components used in accordance with the invention for producing the coating composition of the invention, namely components (A) and (B) and also, optionally, (D), (E), organic solvents and optionally further water, in a step (5), by means of high-speed stirrers, stirred tanks, agitator mills, dissolvers, kneading devices, or in-line dissolvers, for example.

The polyamide (C1) used in step (2) is obtained preferably in accordance with aforementioned step (0).

Use

A further subject of the present invention is a use of the coating composition of the invention for at least partly coating an optionally coated substrate with a basecoat film.

Examples of suitable substrates include articles made of metal or plastic that are to be coated, such as bodies and parts thereof, produced therefrom, of motor vehicles such as automobiles, trucks, motorcycles, and buses, and parts of electrical household appliances, produced from metal or plastic.

Method, Basecoat Film, and Substrate

A further subject of the present invention is a method for at least partly coating an optionally coated substrate with a basecoat film, comprising at least one step (a):

(a) at least partly coating at least one optionally coated substrate with a basecoat film with the aqueous coating composition of the invention.

Step (a) here takes place by at least partial contacting of the substrate with the coating composition of the invention.

Step (a) may optionally be followed by a further step (b), this being the application of a further coating film, preferably a clearcoat film, to the basecoat film applied by step (a). In that case the method of the invention is a method for producing a multicoat paint system.

A further subject of the present invention is a basecoat film which is obtainable by at least partly coating at least one optionally coated substrate with the aqueous coating composition of the invention, or which is obtainable by the method of the invention.

A further subject of the present invention is a substrate coated at least partly with the aqueous coating composition of the invention or with the basecoat film of the invention.

The coating composition of the invention may be applied here directly or after the preceding at least partial application of a primer coating composition, such as a cationically electrodepositable coating composition (cathodic electrocoat material), and, where necessary, after the at least partial application of a further coating composition to the cathodic electrocoat, to the articles that are to be coated. This is followed preferably by drying of these coating films. The coating composition of the invention is applied preferably as a paint system to automotive bodies and parts thereof. The metallic articles to be coated are preferably subjected beforehand to chemical treatment with phosphates and chromates, preferably phosphates such as metal phosphates, more particularly zinc phosphates. Moreover, known, conventional materials may be employed as undercoating compositions and as intermediate-coating compositions.

The coating composition of the invention may be coated onto these target substrates (including those which have optionally been at least partly coated with the undercoating composition and which, moreover, in a suitable way have been optionally coated at least partly with the intermediate-coating composition) by electrostatic coating, by air-spray coating, and by airless spray coating. The thickness of the resultant coating film thereof is preferably in a range from 5 to 35 μm, more particularly 10 to 25 μm, as cured coating film. The coating film may be dried, for example, by heating for 2 to 40 minutes, preferably 5 to 20 minutes, at 50 to 100° C. (oven temperature).

A clear coating composition may be coated onto the coating film of the coating composition of the invention, after it has cured or without it being cured, i.e., onto a coated side thereof, by a "twice coat once cure" (2-cure 1-bake) process or a "twice coat twice cure" (2-cure 2-bake) process.

Furthermore, the coating compositions of the invention are also suitable for use in a dual application (wet-on-wet painting) to which, after briefly preliminary drying, a clearcoat material is applied, and is baked together with the films painted first (3C1B).

The clear coating composition for the application of a clearcoat of this kind may be applied by first coating the coating composition of the invention onto the target substrate in the manner described, and by coating the clear coating composition, with a solids content in the coating composition controlled at preferably 30 to 80 wt %, onto a coated surface of said substrate, by means of electrostatic coating, air spray coating, and airless spray coating, after the curing of a coating film thereof by heating, or in an uncured state. The film thickness of the clear coating composition is preferably in a range of commonly 5 to 100 µm, more particularly 20 to 80 µm, based on the cured coating film. The entire coating film may be cured by heating for 10 to 40 minutes at 100 to 180° C.

Methods of Determination

1. Determining the Acid Number

The acid number is determined in accordance with DIN EN ISO 2114 (date: June 2002), using "method A". The acid number corresponds to the mass of potassium hydroxide in mg which is needed to neutralize 1 g of sample under the conditions specified in DIN EN ISO 2114.

2. Determining the OH Number

The OH number is determined in accordance with DIN 53240-2 (date: November 2007). In this method, the OH groups are reacted by acetylation with an excess of acetic anhydride. The excess acetic anhydride is subsequently cleaved by addition of water to form acetic acid, and the entire acetic acid is back-titrated with ethanolic KOH. The OH number indicates the amount of KOH in mg which is equivalent to the amount of acetic acid bound in the acetylation of 1 g of sample.

3. Determining the Nonvolatile Fraction

The nonvolatile fraction is determined in accordance with DIN EN ISO 3251 (date: June 2008). This determination is accomplished by weighing out 1 g of sample into an aluminum dish dried beforehand and carrying out drying in a drying oven at 125° C. for 60 minutes, followed by cooling in a desiccator, and then by reweighing. The residue, relative to the total amount of the sample employed, corresponds to the nonvolatile fraction.

4. Determining the Lightness and the Flop Index

For determining the lightness or the flop index, an inventive coating composition (or a comparative coating composition) is applied as waterborne basecoat material to a steel panel, coated with a surfacer coating and measuring 32×60 cm, by means of dual application, with application in the first step taking place electrostatically with a dry film thickness of 8-9 µm, and application in the second step taking place pneumatically, after a 2-minute flashing time at room temperature (18 to 23° C.), with a dry film thickness of 4-5 µm. Subsequently, after a further flashing time of 5 minutes at room temperature, the resulting waterborne basecoat film is dried in a forced air oven at 80° C. for 5 minutes. Applied atop the dried waterborne basecoat film is a commercial two-component clearcoat material (ProGloss® from BASF Coatings GmbH), with a dry film thickness of 40-45 µm. The resulting clearcoat film is flashed at room temperature (18 to 23° C.) over a time of 10 minutes. This is followed by curing in a forced air oven at 140° C. for a further 20 minutes. The substrate coated accordingly is subjected to measurement using an X-Rite spectrophotometer (X-Rite MA68 Multi-Angle Spectrophotometer). Here, the surface is illuminated with a light source. Spectral detection is carried out in the visible range, from different angles. The spectral measurements obtained in this way can be used, taking into account the standardized spectral values and also the reflection spectrum of the light source used, to calculate color values in the CIEL*a*b* color space, where L* characterizes the lightness, a* the red-green value, and b* the yellow-blue value. This method is described in, for example, ASTM E2194-12, especially for coatings whose pigment comprises at least one effect pigment. The derived value, often employed to quantify the so-called metallic effect, is the so-called flop index, which describes the relationship between the lightness and the angle of observation (cf. A. B. J. Rodriguez, JOCCA, 1992 (4), pp. 150-153). From the lightness values determined for the viewing angles of 150, 450, and 1100, it is possible to calculate the flop index (FL) according to the formula $$FL=2.69(L^*_{15°}-L^*_{110°})^{1.11}/(L^*_{45°})^{0.86}$$

where L* is the lightness value measured at the respective angle (150, 450, and 1100)

5. Assessing the Incidence of Bits

For assessing the incidence of bits, an inventive coating composition (or a comparative coating composition) is applied as waterborne basecoat material to a steel panel, coated with a surfacer coating and measuring 32×60 cm, by means of dual application, with application in the first step taking place electrostatically with a dry film thickness of 8-9 µm, and application in the second step taking place pneumatically, after a 2-minute flashing time at room temperature (18 to 23° C.), with a dry film thickness of 4-5 µm. Subsequently, after a further flashing time of 5 minutes at room temperature, the resulting waterborne basecoat film is dried in a forced air oven at 80° C. for 5 minutes. Applied atop the dried waterborne basecoat film is a commercial two-component clearcoat material (ProGloss® from BASF Coatings GmbH), with a dry film thickness of 40-45 µm. The resulting clearcoat film is flashed at room temperature (18 to 23° C.) over a time of 10 minutes. This is followed by curing in a forced air oven at 140° C. for a further 20 minutes.

Bits are evaluated visually, with a rating of 1-5 being awarded (1=no bits/5=very many bits).

6. Assessing Incidence of Pinholes

To assess the incidence of pinholes, an inventive coating composition (or a comparative coating composition) is applied as waterborne basecoat material to a steel panel coated with a surfacer coating and measuring 32×60 cm, by means of single application. Beforehand, the steel panel is provided at one long edge with two adhesive strips (Tesaband, 19 mm), in order to allow differences in film thickness to be determined after coating has taken place. The waterborne basecoat material is then applied electrostatically with a dry film thickness of 16-19 µm. The resulting waterborne basecoat film, after a flashing time at room temperature (18 to 23° C.) of 5 minutes, is subsequently dried in a forced air oven at 80° C. for 10 minutes. Following removal of one of the two adhesive strips, a gravity-feed spray gun is used manually to apply a commercial two-component clearcoat material (Evergloss® from BASF Coatings GmbH) to the dried waterborne basecoat film, in a wedge format with a dry film thickness of 0-55 µm. The resulting clearcoat film is flashed at room temperature (18 to 23° C.) for 10 minutes; this is followed by curing in a forced air oven at 140° C. for a further 20 minutes. Following removal of the second adhesive strip, the dry film thickness of the waterborne basecoat is checked, and for the clearcoat wedge the film thickness ranges 20-30 µm, 30-40 µm and 40-50 µm are marked on the steel panel. The respective film thicknesses are determined here in accordance with DIN EN ISO 2808 (date: May 2007), method 12A (e.g., with the MiniTest 3100-4100 instrument from ElektroPhysik).

The pinholes are evaluated visually in the three separate clearcoat dry film thickness ranges (20-30 µm, 30-40 µm and 40-50 µm). The number of pinholes in each region is counted. All results are standardized to an area of 200 cm².

Additionally, where appropriate, a record is kept of the clearcoat dry film thickness above which pinholes no longer occur.

7. Determining the Leveling after Condensation Water Treatment

The leveling or the wavyness of the coated substrates is evaluated using a Wave scan instrument from Byk/Gardner. The coated substrates are produced by dual application as described in section 4. For this purpose, a laser beam is directed at an angle of 600 onto the surface under investigation, and, over a measurement distance of 10 cm, the fluctuations in the reflected light are recorded in the shortwave range (0.3 to 1.2 mm) and in the longwave range (1.2 to 12 mm), using the instrument (longwave=LW; shortwave=SW; the lower the figures, the better the appearance). These measurements are carried out before and after condensation water exposure. The coated substrates are then stored over a period of 10 days in a conditioning chamber under CH test conditions according to DIN EN ISO 6270-2 (date: September 2005). The coated substrates are subsequently inspected, 24 hours following removal from the conditioning chamber, the inspection being visually for blistering, and with assessments being made also of the leveling or waviness.

8. Determining the Storage Stability

The storage stability of the inventive coating compositions (or of comparative coating compositions) is determined by investigating them before and after two-week storage at 40° C., using a rotary viscometer corresponding to DIN 53019-1 (date: September 2008) and in accordance with DIN 53019-2 (date: February 2001) under controlled conditions (23.0° C.±0.2° C.). The samples are first subjected to preliminary shearing for 3 minutes at a rate of 100 $s^{-1}$. This is followed by conditioning without a shearing load. For the measurement of a flow curve, a shear rate range from 0.1 $s^{-1}$ to 1000 $s^{-1}$ is traveled within about 5 minutes (upward curve). Thereafter, shearing is maintained at 1000 $s^{-1}$ for a minute (holding time), before it is subsequently run down again over approximately 5 minutes in a shear rate range from 1000 $s^{-1}$ to 0.1 $s^{-1}$ (downward curve). 36 measurement points are captured during the upward and downward curves, and 10 measurement points during the holding time. The average viscosity level during the holding time (high-shear viscosity) and the viscosity level at 1 $s^{-1}$ (low-shear viscosity), determined from the downward curve, are determined from the data, and the values before and after storage are compared with one another.

9. Determining the MEQ Values

The MEQ value indicates the number of milliequivalents (MEQ) of acids (MEQ(acid)) or bases (MEQ(base)) which are present in 100 g of the nonvolatile fraction of a sample, and it is expressed in a method based on DIN EN ISO 15880 (date: September 2004).

A sample weighed out to an accuracy of 0.001 g is admixed to 70 ml of a suitable solvent such as methoxypropanol, for example. If a polymeric resin is used as sample, then 3000 to 5000 g of the sample are weighed out. Where the sample is a dispersion, 8000 to 10 000 g of this dispersion are weighed out and to start with its solids content is determined by the method described above, before the solvent is added. For the determination of the MEQ(acid) value, 6 drops of phenolphthalene solution are added to the sample solution, and titration takes place with aqueous potassium hydroxide solution (0.5 M) until there is a color change from colorless to pink. For determining the MEQ (base) value, 6 drops of bromophenol blue solution are added to the sample solution, and titration takes place with aqueous hydrochloric acid (0.5 M) until there is a color change from blue to yellow.

10. Determining the Number-Average and Weight-Average Molecular Weights

The number-average molecular weight ($M_n$) is determined by means of gel permeation chromatography (GPC). The method of determination is along the lines of DIN 55672-1 (date: August 2007). Besides the number-average molecular weight, this method may also be used to determine the weight-average molecular weight ($M_w$) and also the polydispersity (ratio of weight-average molecular weight ($M_w$) to number-average molecular weight ($M_n$)). Tetrahydrofuran is used as eluent. The determination is made against polystyrene standards. The column material consists of styrene-divinylbenzene copolymers.

11. Assessing the Incidence of Bits on Application of the Inventively Employed Aqueous Dispersions of the Thickener (C), or of a Comparative Dispersion, to a Substrate To assess the incidence of bits, the dispersions are investigated by the following general protocol:

The respective dispersion is applied using a 100 μm four-way bar applicator to a glass panel. In the wet state, the film thus formed, after a 60-minute flashing time at 18 to 23° C., is assessed visually for the incidence of bits, by holding it against a light source, so as not to misinterpret any air inclusions as bits. A rating of 1-5 is awarded (1=no bits/ 5=very many bits).

The inventive and comparative examples below serve to illustrate the invention, but should not be interpreted as imposing any restriction.

INVENTIVE AND COMPARATIVE EXAMPLES

Unless indicated otherwise, the amounts in parts are parts by weight, and the amounts in percent are percentages by weight, in each case.

1. Preparing Polyamides (C1) Employed Inventively to Prepare the Thickener (C)

1.1 General Instructions for Preparing Polyamides (C1):

At least one polycarboxylic acid (C1a) or a corresponding derivative thereof, such as a corresponding ester or a corresponding anhydride, for example, and optionally at least one organic solvent are introduced in a reaction vessel with stirrer, reflux condenser, and water separator, and are mixed with at least one polyamine (C1b), and this mixture is heated with stirring at a temperature in the range from 160 to 240° C. until the desired amount of water and any organic solvent present has been separated off, this indicating the complete or desired reaction of component (C1a) with component (C1b) for preparing the polyamide (C1).

Polyamide 1

Polyamide 1 is prepared by introducing 687.5 g dimerized fatty acid (commercially available product Pripol® 1012 from Croda) and dodecanedicarboxylic acid (57.5 g) in 22.4 g of xylene and heating the resulting mixture M1 to 60° C. 116.20 g of hexamethylenediamine are melted at an oven temperature of 80° C. and added in portions to the mixture M1. After the end of the addition, the mixture is heated first for a duration of 10 minutes at 130 to 140° C., and thereafter at 175° C. This temperature is maintained, and the water formed is removed by distillation. The acid number of the resulting mixture is determined a number of times during this process. The reaction is continued until an acid number of 68.5 mg KOH/g is reached (after about 3 hours).

Polyamide 2

Polyamide 2 is prepared by introducing 724.1 g dimerized fatty acid (commercially available product Pripol® 1012 from Croda) in 21.7 g of xylene and heating the resulting mixture M1 to 60° C. 116.2 g of hexamethylenediamine are melted at an oven temperature of 80° and added in portions to the mixture M1. After the end of the addition, the mixture is heated first for a duration of 10 minutes at 130 to 140° C., and thereafter at 175° C. This temperature is maintained, and the water formed is removed by distillation. The acid number of the resulting mixture is determined a number of times during this process. The reaction is continued until an acid number of 37.9 mg KOH/g is reached.

2. Preparation of Inventively Employed Thickeners (C)

2.1 General Instructions for Preparing Inventively Employed Thickeners (C):

A melt of at least one polyamide (C1) is prepared. This melt is introduced into a dispersion or solution of at least one polymer (C2) in at least one organic solvent such as MEK, for example. Added to this mixture are water and optionally at least one neutralizing agent. The at least one organic solvent is removed, to give the aqueously dispersed thickener (C).

Thickener 1

First of all, 600 g of a solvent-containing dispersion of a polyurethane as a polymer (C2), with a solids fraction of 70 wt %, are introduced and heated to a temperature of 80° C. This solvent-containing polyurethane dispersion is prepared as described in EP 0 228 003 A1, page 8, lines 5 to 16, and comprises methyl ethyl ketone (MEK) as organic solvent. Subsequently a melt of 172.1 g of polyamide 1 (melt obtained by heating at 140° C.) is added in portions over a time of 30 minutes, with stirring, to the solvent-containing polyurethane dispersion. Metered into this mixture thereafter are 37.9 g of dimethylethanolamine (DMEA) over a duration of 30 minutes, and the resulting mixture is stirred for a further 30 minutes. 1693.6 g of deionized water are added to this mixture over a duration of 1 hour, and the mixture is stirred for a time of one hour more. The MEK is removed by distillation and the solids content of the resulting thickener (C) is optionally adjusted by addition of deionized water to 30 wt %, if too much water is removed in the distillative removal of MEK, so that the solids content is >30 wt %. MEQ values as follows were determined: MEQ(acid): 0.683 mmol/g; MEQ(base): 0.695 mmol/g. Thickener 1 is used subsequently in the form of the resulting aqueous dispersion.

Thickener 2

First of all, 600 g of a solvent-containing dispersion of a polyurethane as a polymer (C2), with a solids fraction of 70 wt %, are introduced and heated to a temperature of 80° C. This solvent-containing polyurethane dispersion is prepared as described in EP 0 228 003 A1, page 8, lines 5 to 16, and comprises methyl ethyl ketone as organic solvent. Subsequently a melt of 172.1 g of polyamide 2 (melt obtained by heating at 140° C.) is added in portions over a time of 30 minutes, with stirring, to the solvent-containing polyurethane dispersion. Metered into this mixture thereafter are 25.6 g of dimethylethanolamine (DMEA) over a duration of 30 minutes, and the resulting mixture is stirred for a further 30 minutes. 1658.6 g of deionized water are added to this mixture over a duration of 1 hour, and the mixture is stirred for a time of one hour more. The MEK is removed by distillation and the solids content of the resulting thickener (C) is optionally adjusted by addition of deionized water to 25 wt %, if too much water is removed in the distillative removal of MEK, so that the solids content is >25 wt %. MEQ values as follows were determined: MEQ(acid): 0.506 mmol/g; MEQ(base): 0.505 mmol/g. Thickener 2 is used subsequently in the form of the resulting aqueous dispersion.

3. Preparation of Inventive Coating Compositions and Comparative Coating Compositions 3.1 the Components of the Respective Coating Composition, Specified Below, have the Following Meanings:

The aqueous dispersion of a polymeric resin (I) is prepared as described on page 20, lines 9 to 21, of DE 199 48 004 A1.

The aqueous dispersion of a polymeric resin (II) is prepared as described in column 16, lines 37 to 59 of DE 40 09 858 A1, within example D.

The aqueous dispersion of a polymeric resin (III) is prepared as described on page 7, line 55 to page 8, line 23 of DE 44 37 535 A1.

The aqueous dispersion of a polymeric resin (IV) is prepared as described on page 8, lines 5 to 20 of EP 0 228 003 A1.

Rheovis® AS 1130 is a commercially available aqueous solution from BASF SE, containing 30 wt % of thickener based on an acrylic copolymer.

Rheovis® PU 1250 is a commercially available aqueous butyl diglycol solution from BASF SE, containing 40 wt % of a thickener based on a polyurethane.

Luwipal® 052 is a melamine-formaldehyde resin from BASF SE.

Cymel® 203 is a melamine-formaldehyde resin from Allnex.

Disparlon® AQ630 is a commercially available dispersion of a polyamide from Kusumoto Chemicals Co. Ltd. with a nonvolatile polyamide fraction of 18 wt %.

Disparlon® AQ600 is a commercially available dispersion of a polyamide from Kusumoto Chemicals Co. Ltd. with a nonvolatile polyamide fraction of 20 wt %.

Alu Stapa Hydrolux® 2154 & VP56450 are two commercially available aluminum pigments, available from Altana-Eckart.

Pluriol® E300 is a commercially available polyethylene glycol from BASF SE.

Agitan® 281 is a commercially available defoamer from Munzing Chemie GmbH.

The aqueous dispersion of the polyamide 1 is prepared as follows: The polyamide 1 is prepared as described in section 1.1. Subsequently, after attainment of an acid number of 68.5 mg KOH/g (after about 3 hours), the resulting polyamide 1 is cooled to 120° C., 413 g of butyl glycol are added to it, and the resulting mixture is admixed at 100° C. with dimethylethanolamine (DMEA) (85.5 g) and stirred. The resulting mixture is introduced into 1600 g of deionized water which has a temperature of 90-95° C. The resulting mixture is subsequently stirred at 80° C. for 30 minutes and then first cooled to 60° C. and left with stirring. The solids content is 22.6 wt %. MEQ values as follows were determined: MEQ(acid): 1.058 mmol/g; MEQ(base): 1.076 mmol/g.

The aqueous dispersion of the polyamide 2 is prepared as follows: The polyamide 2 is prepared as described in section 1.1. Subsequently, after attainment of an acid number of 37.9 mg KOH/g, the resulting polyamide 2 is cooled to 120° C., and 200 g of the resulting mixture are then introduced into a mixture of dimethylethanolamine (DMEA) (12.3 g), 0.3 g of Agitan® 281, and 1171.4 g of deionized water which has a temperature of 90-95° C. The solids content is 20.0 wt %. MEQ values as follows were determined: MEQ(acid): 1.460 mmol/g; MEQ(base): 0.595 mmol/g.

3.2 General Operating Procedure for Producing Inventive Coating Compositions and Comparative Coating Compositions:

The components listed under "aqueous phase 1" in each of the tables below are stirred together in the order stated to form an aqueous mixture M1. Subsequently, the components listed under "aqueous phase 2" in the tables below are stirred together in the order stated, to form a second aqueous mixture M2, which is added to the aqueous mixture M1 and stirred for 10 minutes. The result in each case is the aqueous mixture M3. In the next step, an organic mixture is prepared from the components listed under "organic phase" in each of the tables below. The organic mixture is added to the aqueous mixture M3. The combined mixture is then stirred for 10 minutes and adjusted using deionized water and dimethylethanolamine to a pH of 8 and to a defined spray viscosity under a shearing load of $1000\ s^{-1}$ as measured with a rotary viscometer (Rheolab QC instrument with C-LTD80/QC conditioning system, from Anton Paar) at 23° C. In the case of coating compositions V1, V2, and B1, a spray viscosity of 90±5 mPa·s is set. In the case of coating composition B2, a spray viscosity of 95±5 mPa·s is set. In the case of each of coating compositions V3, V4, V5, V6, V7, and V8, and also B3, B4, B5, B6, B7, B8, and B9, a spray viscosity of 80±5 mPa·s is set.

The respective quantity figures in each of the tables below represent parts by weight in each case.

3.3 Coating Compositions V1 and V2 (Noninventive) and B1 (Inventive)

TABLE 1.1

Preparation of V1, V2, and B1

|  | V1 | V2 | B1 |
|---|---|---|---|
| Aqueous phase 1 | | | |
| Aqueous dispersion of a polymeric resin (I) | 21.00 | 21.00 | 9.00 |
| Deionized water | 18.85 | 26.69 | 22.29 |
| Butyl glycol | 3.33 | 3.62 | 3.62 |
| Butanol | 1.57 | 1.57 | 1.57 |
| Aqueous dispersion of a polymeric resin (II) | 1.65 | 1.68 | 1.68 |
| Rheovis ® AS 1130 | 4.75 | 4.32 | 4.32 |
| Dimethylethanolamine in water (10 wt %) | 0.37 | 0.36 | 0.36 |
| Luwipal ® 052 | 4.11 | 4.11 | 4.11 |
| 2,4,7,9-Tetramethyl-5-decynediol in butyl glycol (52 wt %) | 2.51 | 2.41 | 2.41 |
| Aqueous dispersion of a polymeric resin (III) | 4.50 | 4.84 | 4.84 |
| Rheovis ® PU1250 | 0.99 | 0.90 | 0.90 |
| Aqueous phase 2 | | | |
| Deionized water | 14.27 | — | — |
| Dimethylethanolamine in water (10 wt %) | 0.01 | — | — |
| Disparlon ® AQ630 | 6.39 | — | — |
| Butyl glycol | 0.64 | — | — |
| Aqueous dispersion of polyamide 2 | — | 4.60 | — |
| Inventively employed thickener 2 | — | — | 21.00 |
| Organic phase | | | |
| Mixture of Alu Stapa Hydrolux ® 2154 & VP56450 | 5.10 | 5.10 | 5.10 |
| Butyl glycol | 6.35 | 6.35 | 6.35 |
| Aqueous dispersion of a polymeric resin (II) | 1.90 | 2.16 | 2.16 |
| Dimethylethanolamine in water (10 wt %) | 0.22 | 0.22 | 0.22 |

3.4 Coating Composition B2 (Inventive)

TABLE 1.2

Preparation of B2

|  | B2 |
|---|---|
| Aqueous phase 1 | |
| Aqueous dispersion of a polymeric resin (I) | 21.51 |
| Deionized water | 29.38 |
| Butyl glycol | 3.62 |
| Butanol | 1.57 |
| Aqueous dispersion of a polymeric resin (II) | 1.68 |
| Rheovis ® AS 1130 | 4.32 |
| Dimethylethanol amine in water (10 wt %) | 0.36 |
| Luwipal ® 052 | 4.11 |
| 2,4,7,9-Tetramethyl-5-decynediol in butyl glycol (52 wt %) | 2.41 |
| Aqueous dispersion of a polymeric resin (III) | 4.84 |
| Rheovis ® AS 1250 | 0.90 |
| Aqueous phase 2 | |
| Inventively employed thickener 2 | 11.40 |
| Organic phase | |
| Mixture of Alu Stapa Hydrolux ® 2154 & VP56450 | 5.17 |
| Butyl glycol | 6.35 |
| Aqueous dispersion of a polymeric resin (II) | 2.16 |
| Dimethylethanol amine in water (10 wt %) | 0.22 |

3.5 Coating Compositions V3 (Noninventive) and B3 (Inventive)

TABLE 1.3

Preparation of V3 and B3

|  | V3 | B3 |
|---|---|---|
| Aqueous phase 1 | | |
| Aqueous dispersion of a polymeric resin (IV) | 34.73 | 28.41 |
| Deionized water | 13.02 | 13.02 |
| Butyl glycol | 3.33 | 3.33 |
| Butanol | 2.35 | 2.35 |
| Rheovis ® AS 1130 | 0.63 | 0.63 |
| Deionized water | 1.88 | 1.88 |
| Dimethylethanolamine in water (10 wt %) | 0.59 | 0.59 |
| Cymel ® 203 | 2.74 | 2.74 |
| 2,4,7,9-Tetramethyl-5-decynediol in butyl glycol (52 wt %) | 2.51 | 2.51 |
| Aqueous dispersion of a polymeric resin (III) | 4.50 | 4.50 |
| Aqueous phase 2 | | |
| Deionized water | 12.80 | 2.51 |
| Dimethylethanolamine in water (10 wt %) | 0.01 | 0.01 |
| Disparlon ® AQ630 | 3.80 | — |
| Butyl glycol | 0.51 | 0.34 |
| Inventively emloyed thickener 1 | — | 8.56 |
| Organic phase | | |
| Mixture of Alu Stapa Hydrolux ® 2154 & VP56450 | 5.10 | 5.10 |
| Propyl glycol | 6.35 | 6.35 |

3.6 Coating Compositions V4 (Noninventive) and B4 (Inventive)

TABLE 1.4

Preparation of V4 and B4

|  | V4 | B4 |
|---|---|---|
| Aqueous phase 1 | | |
| Aqueous dispersion of a polymeric resin (IV) | 28.00 | 13.48 |
| Deionized water | 23.80 | 21.92 |
| n-Butoxypropanol | 3.20 | 3.20 |
| Aqueous dispersion of a polymeric resin (II) | 2.70 | 2.70 |
| Rheovis ® AS 1130 | 1.00 | 1.00 |
| Deionized water | 5.00 | 5.00 |
| Dimethylethanolamine in water (10 wt %) | 0.30 | 0.30 |
| Dimethylethanolamine | 0.25 | 0.25 |
| Cymel ® 203 | 3.70 | 3.70 |
| Aqueous dispersion of a polymeric resin (III) | 3.60 | 3.60 |
| Aqueous phase 2 | | |
| Aqueous dispersion of polyamide 2 | 4.60 | — |
| Inventively employed thickener 2 | — | 21.00 |
| Organic phase | | |
| Mixture of Alu Stapa Hydrolux ® 2154 & VP56450 | 5.30 | 5.30 |
| Butyl glycol | 5.75 | 5.75 |
| Pluriol ® E300 | 2.80 | 2.80 |

3.7 Coating Compositions V5 (Noninventive) and B5 (Inventive)

TABLE 1.5

Preparation of V5 and B5

|  | V5 | B5 |
|---|---|---|
| Aqueous phase 1 | | |
| Aqueous dispersion of a polymeric resin (I) | 22.30 | 17.05 |
| Deionized water | 13.02 | 13.02 |
| Butyl glycol | 3.33 | 3.33 |
| Butanol | 2.35 | 2.35 |
| Aqueous dispersion of a polymeric resin (II) | 1.65 | 1.65 |
| Aquatix ® 821 | 1.67 | 1.67 |
| Dimethylethanolamine in water (10 wt %) | 0.37 | 0.37 |
| Cymel ® 203 | 2.74 | 2.74 |
| 2,4,7,9-Tetramethyl-5-decynediol in butyl glycol (52 wt %) | 2.51 | 2.51 |
| Aqueous dispersion of a polymeric resin (III) | 4.50 | 4.50 |
| Aqueous phase 2 | | |
| Deionized water | 3.25 | — |
| Aqueous dispersion of polyamide 2 | 2.46 | — |
| Inventively employed thickener 2 | — | 8.42 |
| Organic phase | | |
| Mixture of Alu Stapa Hydrolux ® 2154 & VP56450 | 5.10 | 5.10 |
| Butyl glycol | 6.35 | 6.35 |
| Aqueous dispersion of a polymeric resin (II) | 1.90 | 1.90 |
| Dimethylethanolamine in water (10 wt %) | 0.22 | 0.22 |

3.8 Coating Compositions V6 (Noninventive) and B6 (Inventive)

TABLE 1.6

Preparation of V6 and B6

|  | V6 | B6 |
|---|---|---|
| Aqueous phase 1 | | |
| Aqueous dispersion of a polymeric resin (IV) | 29.66 | 23.34 |
| Aqueous solution of an Na Mg phyllosilicate (3 wt %) | 2.00 | 12.00 |
| Deionized water | 13.02 | 13.02 |
| Butyl glycol | 3.33 | 3.33 |
| Butanol | 1.57 | 1.57 |
| Dimethylethanolamine in water (10 wt %) | 0.37 | 0.37 |
| Luwipal ® 052 | 5.34 | 5.34 |
| 2,4,7,9-Tetramethyl-5-decynediol in butyl glycol (52 wt %) | 2.51 | 2.51 |
| Aqueous dispersion of a polymeric resin (III) | 4.50 | 4.50 |
| Aqueous phase 2 | | |
| Deionized water | 7.61 | — |
| Disparlon ® AQ630 | 3.80 | — |
| Inventively employed thickener 2 | — | 8.56 |
| Organic phase | | |
| Mixture of Alu Stapa Hydrolux ® 2154 & VP56450 | 5.10 | 5.10 |
| Butyl glycol | 6.35 | 6.35 |
| Dimethylethanolamine in water (10 wt %) | 0.22 | 0.22 |

3.9 Coating Compositions V7 (Noninventive) and B7 and B8 (Inventive)

TABLE 1.7

Preparation of V7, B7 and B8

|  | V7 | B7 | B8 |
|---|---|---|---|
| Aqueous phase 1 | | | |
| Aqueous dispersion of a polymeric resin (IV) | 26.84 | 14..19 | 14.19 |
| Deionized water | 13.02 | 13.02 | 13.02 |
| Butyl glycol | 3.33 | 3.62 | 3.62 |
| Butanol | 1.57 | 1.57 | 1.57 |
| Aqueous dispersion of a polymeric resin (II) | 1.65 | 1.65 | 1.65 |
| Rheovis ® AS 1130 | 0.21 | 0.21 | 0.21 |
| Deionized water | 0.63 | 0.63 | 0.63 |
| Dimethylethanolamine in water (10 wt %) | 0.37 | 0.37 | 0.37 |
| Luwipal ® 052 | 3.58 | 3.56 | 3.56 |
| 2,4,7,9-Tetramethyl-5-decynediol in butyl glycol (52 wt %) | 2.51 | 2.51 | 2.51 |
| Aqueous dispersion of a polymeric resin (III) | 4.50 | 4.84 | 4.84 |
| Aqueous phase 2 | | | |
| Deionized water | 26.34 | 5.29 | 5.01 |
| Disparlon ® AQ600 | 6.84 | — | — |
| Butyl glycol | 1.03 | 0.68 | 0.68 |
| Inventively employed thickener 2 | — | 16.83 | — |
| Inventively employed thickener 1 | — | — | 17.10 |
| Organic phase | | | |
| Mixture of Alu Stapa Hydrolux ® 2154 & VP56450 | 5.10 | 5.10 | 5.10 |
| Butyl glycol | 6.35 | 6.35 | 6.35 |
| Aqueous dispersion of a polymeric resin (II) | 1.90 | 1.90 | 1.90 |
| Dimethylethanolamine in water (10 wt %) | 0.22 | 0.22 | 0.22 |

3.10 Coating Compositions V8 (Noninventive) and B9 (Inventive)

TABLE 1.8

Preparation of B9 and V8

|  | B9 | V8 |
|---|---|---|
| Aqueous phase 1 | | |
| Aqueous dispersion of a polymeric resin (I) | 9.00 | 19.00 |
| Deionized water | 25.45 | 26.94 |
| Butyl glycol | 3.33 | 3.47 |
| Butanol | 1.57 | 1.57 |
| Aqueous dispersion of a polymeric resin (II) | 1.65 | 1.65 |
| Rheovis ® AS 1130 | 4.32 | 4.75 |
| Dimethylethanolamine in water (10 wt %) | 0.37 | 0.40 |
| Luwipal ® 052 | 3.60 | 3.60 |
| 2,4,7,9-Tetramethyl-5-decynediol in butyl glycol (52 wt %) | 2.51 | 2.65 |
| Aqueous dispersion of a polymeric resin (III) | 4.50 | 4.50 |
| Rheovis ® PU 1250 | 0.99 | 0.99 |
| Aqueous phase 2 | | |
| Deionized water | 8.99 | 6.12 |
| Agitan ® 281 | 0.03 | 0.02 |
| Aqueous dispersion of polyamide 1 | — | 5.80 |
| Inventively employed thickener 1 | 15.91 | — |
| 2,4,7,9-Tetramethyl-5-decynediol in butyl glycol (52 wt %) | 0.13 | 0.06 |
| Organic phase | | |
| Mixture of Alu Stapa Hydrolux ® 2154 & VP56450 | 4.20 | 4.20 |
| Butyl glycol | 6.35 | 6.99 |
| Aqueous dispersion of a polymeric resin (II) | 1.90 | 1.90 |
| Dimethylethanolamine in water (10 wt %) | 0.22 | 0.24 |

3.11 Summary of the Inventive Coating Compositions and Comparative Coating Compositions Produced, in Terms of the Thickeners (C) (Inventive) they Each Contain or the Polyamide Components (Noninventive) they Each Contain.

A corresponding summary is given in Table 1.9 below:

| Composition | Thickeners | inventive | non-inventive |
|---|---|---|---|
| V1 | Disparlon ® AQ630 | | X |
| V2 | Aqueous dispersion of polyamide 2 | | X |
| B1 | Inventively employed thickener 2 | X | |
| B2 | Inventively employed thickener 2 | X | |
| V3 | Disparlon ® AQ630 | | X |
| B3 | Inventively employed thickener 1 | X | |
| V4 | Aqueous dispersion of polyamide 2 | | X |
| B4 | Inventively employed thickener 2 | X | |
| V5 | Aqueous dispersion of polyamide 2 | | X |
| B5 | Inventively employed thickener 2 | X | |
| V6 | Disparlon ® AQ630 | | X |
| B6 | Inventively employed thickener 2 | X | |
| V7 | Disparlon ® AQ600 | | X |
| B7 | Inventively employed thickener 2 | X | |
| B8 | Inventively employed thickener 1 | X | |
| B9 | Inventively employed thickener 1 | X | |
| V8 | Aqueous dispersion of polyamide 1 | | X |

4. Tests and Investigations 4.1 Investigations into the Incidence of Pinholes

This investigation takes place in accordance with the method described above. The inventive coating composition B1 and also the comparative coating composition V1 as waterborne basecoat material are applied to a steel panel coated with a primer-surfacer system. Subsequently, as described within the method, a clearcoat material is applied to the resulting respective basecoat films.

The results are summarized in Table 1.10. The number of pinholes as reported is standardized to 200 cm$^2$.

TABLE 1.10

Results of the investigations into the incidence of pinholes

| Film thickness range Clearcoat wedge | V1 | B1 |
|---|---|---|
| 20-30 μm | 9 | 0 |
| 30-40 μm | 28 | 0 |
| 40-50 μm | 0 | 0 |
| Total | 37 | 0 |

The results demonstrate that the inventive coating composition B1 comprising the inventively employed thickener (C), in comparison to V1, comprising the commercially available polyamide Disparlon® AQ 630, shows an improved profile of properties in relation to pinhole robustness.

4.2 Investigations Concerning Storage Stability

This investigation takes place in accordance with the method described above. The inventive coating composition B2 and also the comparative coating composition V2 are investigated here.

The results are summarized in Table 1.11.

TABLE 1.11

Results of the investigations into storage stability

|  |  | V2 | B2 |
|---|---|---|---|
| Low-shear viscosity (1 s$^{-1}$) in mPa · s | directly after preparation | 937 | 567 |
| | after 2 weeks' storage at 40° C. | 275 | 596 |
| | Change [%] | −71% | 5% |
| High-shear Viscosity (1000 s$^{-1}$) in mPa · s | directly after preparation | 82 | 104 |
| | after 2 weeks' storage at 40° C. | 58 | 96 |
| | Change [%] | −29% | −8% |

The results demonstrate that the inventive coating composition B2 comprising the inventively employed thickener (C), in comparison to V2 comprising the polyamide 2 as such, exhibits a very good storage stability: the rheological behavior of the waterborne basecoat B2 material does not change hardly at all even after two-week storage at 40° C. In contrast, V2 shows a significantly weaker storage stability.

4.3 Investigations into the Leveling after Condensation Water Treatment

This investigation takes place in accordance with the method described above. The inventive coating compositions B1 or B3 and also the comparative coating compositions V2 or V3 are in this test each applied as waterborne basecoat material to a steel panel coated with a primer-surfacer system. Subsequently, as described within the method, a clearcoat material is applied to the resulting respective basecoat films. The results are summarized in Table 1.12.

TABLE 1.12

Results of the investigations into leveling after condensation water treatment

|  |  | V2 | B1 | V3 | B3 |
|---|---|---|---|---|---|
| Longwave (LW) | before condensation water exposure | 7.6 | 2.7 | 2.3 | 2.7 |
|  | after condensation water exposure | 18.1 | 2.6 | 11.2 | 2.5 |
|  | Change [%] | 138% | −4% | 387% | −7% |
| Shortwave(SW) | before condensation water exposure | 21.3 | 17.8 | 17.4 | 14.2 |
|  | after condensation water exposure | 21.5 | 14 | 15.1 | 13.7 |
|  | Change [%] | 1% | −21% | −13% | −4% |

The results demonstrate that the inventive coating compositions B1 and B3, comprising the inventively employed thickener (C), in comparison to V1 and V3, which each comprise the polyamide Disparlon® AQ 630 or Disparlon® AQ 600, respectively, have advantages both before and after condensation water exposure, demonstrating that there is no swelling of the multicoat construction, comprising a basecoat film obtained from any of these compositions, that is manifested in high values for LW and/or SW.

4.4 Investigations into Angle-Dependent Lightnesses and Flop Indices

This investigation takes place in accordance with the method described above. The inventive coating composition B4 and also the comparative coating composition V4 are applied, in each case in the form of a waterborne basecoat film, to a steel panel coated with a primer-surfacer system. Subsequently, as described within the method, a clearcoat material is applied to the resulting respective basecoat films. The results are summarized in Table 1.13.

TABLE 1.13

Results of the investigations into angle-dependent lightnesses and flop indices

|  | V4 | B4 |
|---|---|---|
| $L^*_{15°}$ | 133.1 | 137.8 |
| $L^*_{25°}$ | 109.7 | 110.2 |
| $L^*_{45°}$ | 68.3 | 65.0 |
| $L^*_{75°}$ | 40.5 | 38.3 |
| $L^*_{110°}$ | 34.0 | 32.8 |
| Flop index | 11.7 | 13.0 |

The results demonstrate that the inventive coating composition B4, comprising an inventively employed thickener (C) prepared from the polyamide 2, in comparison to V4, comprising in each case only this polyamide 2 as such, exhibits an improved metallic effect, which is characterized by a greater lightness at the 15° angle and also by a higher flop index.

4.5 Investigations into the Incidence of Bits

This investigation takes place in accordance with the method described above. The inventive coating compositions B5, B6, B7, B8 and B9 and also the comparative coating compositions V5, V6, V7 and V8 are each applied as waterborne basecoat material to a steel panel coated with a primer-surfacer system. Subsequently, as described within the method, a clearcoat material is applied to the resulting respective basecoat films.

The results are summarized in Table 1.14.

TABLE 1.14

Results of the investigations into the incidence of bits

|  | V5 | B5 | V6 | B6 | V7 | B8 | B9 | V8 |
|---|---|---|---|---|---|---|---|---|
| Assessment of bits (ratings 1 to 5) | 5 | 1 | 5 | 1 | 4 | 1 | 2 | 5 |

The results demonstrate that the inventive coating compositions B5, B6, B7, B8 and B9, comprising an inventively employed thickener (C), in comparison to V5, V6, V7 and V8, comprising in each case only a polyamide component, permit significantly improved results in relation to bittiness, as a criterion for the compatibility or incorporability of the thickeners into the coating compositions. From a comparison of the experimental data relating to V6 and B6, moreover, it is apparent that a combination of a polyamide and an Na Mg phyllosilicate results in bittiness, while a combination of an inventive thickener and an Na Mg phyllosilicate does not.

4.6 Investigations into the Incidence of Bits

An inventively employed aqueous dispersion of a thickener (thickener 1) is investigated for the incidence of bits, using the method described above. Analogously, an aqueous comparative dispersion having a solids content of approximately 28 wt % is investigated, which comprises in a fraction of 29 wt % the aqueous dispersion of polyamide 1 (which in turn has a solids fraction of 22.6 wt %) and which also comprises, in a fraction of 71 wt %, the aqueous dispersion of the polymeric resin (IV) (prepared as described on page 8, lines 5 to 20, of EP 0 228 003 A1), which in turn has a solids fraction of 30 wt %, based in each case on the total weight of the comparative dispersion.

The results are summarized in Table 1.15.

TABLE 1.15

|  | Aqueous comparative dispersion | Thickener 1 |
|---|---|---|
| Bittiness | 5 | 1 |

From table 1.15 is apparent that in the case of the aqueous comparative dispersion, in contrast to the thickener 1, a multiplicity of bits that have occurred is observed. The aqueous comparative dispersion comprises the same polymeric resins (C1) and (C2) which were also used to prepare the thickener 1; in contrast to the production of the thickener 1, which is obtainable by a process comprising at least the steps (1), (2), (3), and (4) necessary in accordance with the invention, however, these polymeric resins were used simply by mixing to prepare the aqueous comparative dispersion. These results show that it is essential to the invention that the thickener (C) used in accordance with the invention is obtained by the process comprising at least the steps (1), (2), (3), and (4) necessary in accordance with the invention.

The invention claimed is:

1. An aqueous coating composition comprising
at least one binder (A) comprising at least one polymeric resin (A1) and optionally at least one crosslinking agent (A2),
at least one pigment (B), and
an aqueous dispersion of at least one thickener (C),
wherein the at least one thickener (C) is obtainable by a method comprising at least (1), (2), (3), and (4):
(1) preparing a dispersion or solution of at least one polymeric resin (C2) in at least one organic solvent, the at least one polymeric resin (C2) being a polyurethane,
(2) preparing a mixture of the dispersion or solution obtained in (1) and of a melt or solution of at least one polyamide as at least one polymeric resin (C1), which has an acid number in a range from 1 to 200 mg of KOH per g of (C1),
(3) adding water to the mixture obtained in (2), and
(4) removing the at least one organic solvent from the mixture obtained in (3), to give the aqueous dispersion of the at least one thickener (C).

2. The coating composition as claimed in claim 1, wherein the relative weight ratio of (C1) to (C2), based in each case on their solids content, is in the range from 1:10 to 1:1.5.

3. The coating composition as claimed in claim 1, which has a solids content, in terms of the at least one thickener (C), in a range from 0.5 to 15 wt %, based on the total weight of the coating composition.

4. The coating composition as claimed in claim 1, wherein the at least one polyamide used as the at least one polymeric resin (C1) has an acid number in a range from 30 to 120 mg of KOH per g of (C1).

5. The coating composition as claimed in claim 1, wherein the at least one polyamide used as the at least one polymeric resin (C1) is at least obtainable by a reaction of at least one polycarboxylic acid selected from the group consisting of aliphatic $C_3$-$C_{22}$ dicarboxylic acids, polymers of aliphatic $C_{14}$-$C_{22}$ monocarboxylic acids, and mixtures thereof, with at least one aliphatic $C_2$-$C_{12}$ diamine.

6. The coating composition as claimed in claim 1, wherein the at least one thickener (C) has a melting point in the range from 20° C. to 100° C.

7. The coating composition as claimed in claim 1, wherein the at least one pigment (B) comprises at least one effect pigment.

8. The coating composition as claimed in claim 1, wherein the at least one binder (A) comprises at least one polyurethane and/or at least one poly(meth)acrylate and/or at least one polyester as the at least one polymeric resin (A1).

9. The coating composition as claimed in claim 1, which comprises at least one further thickener (D) selected from the group consisting of metal silicates, thickeners based on poly(meth)acrylic acid, thickeners based on polyurethanes, polymeric waxes, and mixtures thereof.

10. The coating composition as claimed in claim 9, wherein the relative weight ratio of the at least one thickener (C) to the at least one further thickener (D) is in the range from 80:1 to 1:1, based on their respective solids content.

11. A method for at least partly coating an optionally coated substrate with a basecoat film, comprising at least (a)
(a) at least partly coating at least one optionally coated substrate with a basecoat film, with the aqueous coating composition as claimed in claim 1.

12. A basecoat film which is obtainable by at least partly coating at least one optionally coated substrate with the aqueous coating composition as claimed in claim 1.

13. A substrate coated at least partly with the aqueous coating composition as claimed in claim 1.

* * * * *

UNITED STATES PATENT AND TRADEMARK OFFICE
CERTIFICATE OF CORRECTION

PATENT NO. : 10,233,340 B2
APPLICATION NO. : 15/505487
DATED : March 19, 2019
INVENTOR(S) : Cathrin Corten et al.

It is certified that error appears in the above-identified patent and that said Letters Patent is hereby corrected as shown below:

In the Specification

Column 11, Line 25, "diketopyrrolopyrrol" should read --diketopyrrolopyrrole--

Column 15, Line 38, "linolic" should read --linoleic--

Column 22, Line 7, "150, 450, and 1100" should read --15°, 45°, and 110°--

Column 22, Line 13, "(150, 450, and 1100)" should read --(15°, 45°, and 110°)--

Column 23, Line 10, "600" should read --60°--

Column 28, Line 61, "emloyed" should read --employed--

Signed and Sealed this
Twenty-first Day of April, 2020

Andrei Iancu
*Director of the United States Patent and Trademark Office*